(12) United States Patent
Cordova et al.

(10) Patent No.: US 11,220,258 B2
(45) Date of Patent: Jan. 11, 2022

(54) SYSTEMS AND METHODS FOR SENSOR-BASED VEHICLE CRASH PREDICTION, DETECTION, AND RECONSTRUCTION

(71) Applicant: CAMBRIDGE MOBILE TELEMATICS INC., Cambridge, MA (US)

(72) Inventors: Brad Cordova, Cambridge, MA (US); Eddie Vaisman, Cambridge, MA (US); Dan Shiebler, Boston, MA (US)

(73) Assignee: CAMBRIDGE MOBILE TELEMATICS INC., Cambridge, MA (US)

( * ) Notice: Subject to any disclaimer, the term of this patent is extended or adjusted under 35 U.S.C. 154(b) by 40 days.

(21) Appl. No.: 15/416,843

(22) Filed: Jan. 26, 2017

(65) Prior Publication Data
US 2017/0210323 A1  Jul. 27, 2017

Related U.S. Application Data

(60) Provisional application No. 62/287,251, filed on Jan. 26, 2016, provisional application No. 62/383,839, filed on Sep. 6, 2016.

(51) Int. Cl.
| | | |
|---|---|---|
| *B60W 30/08* | (2012.01) | |
| *G01C 21/36* | (2006.01) | |
| *G08G 1/01* | (2006.01) | |
| *G08G 1/0962* | (2006.01) | |
| *G08G 1/0967* | (2006.01) | |

(Continued)

(52) U.S. Cl.
CPC ......... *B60W 30/08* (2013.01); *G01C 21/3697* (2013.01); *G08G 1/0112* (2013.01); *G08G 1/0129* (2013.01); *G08G 1/0133* (2013.01); *G08G 1/0141* (2013.01); *G08G 1/09626* (2013.01); *G08G 1/09675* (2013.01); *G08G 1/096716* (2013.01); *G08G 1/096775* (2013.01); *G08G 1/205* (2013.01); *H04W 4/027* (2013.01);

(Continued)

(58) Field of Classification Search
None
See application file for complete search history.

(56) References Cited

U.S. PATENT DOCUMENTS

| | | |
|---|---|---|
| 7,181,192 B2 | 2/2007 | Panasik et al. |
| 8,065,508 B2 | 11/2011 | Rubin et al. |

(Continued)

OTHER PUBLICATIONS

U.S. Appl. No. 15/862,507, "Non-Final Office Action", dated Apr. 13, 2018, 9 pages.

(Continued)

*Primary Examiner* — Rami Khatib
(74) *Attorney, Agent, or Firm* — Kilpatrick Townsend & Stockton LLP

(57) ABSTRACT

Embodiments of the present invention relate to transportation systems. More particularly, embodiments relate to methods and systems of vehicle data collection by a user having a mobile device. In a particular embodiment, vehicle data (also termed herein "driving data" or "data") is collected, analyzed and transformed, and combinations of collected data and transformed data are used in different ways, including, but not limited to, predicting, detecting, and reconstructing vehicle accidents.

20 Claims, 22 Drawing Sheets

(51) Int. Cl.
*G08G 1/00* (2006.01)
*H04W 4/02* (2018.01)
*B60R 21/00* (2006.01)
*H04L 29/08* (2006.01)

(52) U.S. Cl.
CPC ....... *B60R 2021/0027* (2013.01); *H04L 67/12* (2013.01)

(56) References Cited

U.S. PATENT DOCUMENTS

| | | | |
|---|---|---|---|
| 8,610,567 B2 | 12/2013 | Hamed et al. | |
| 8,886,153 B2 | 11/2014 | Velusamy et al. | |
| 9,449,495 B1* | 9/2016 | Call | H04W 4/90 |
| 9,569,984 B2* | 2/2017 | Stankoulov | G09B 19/167 |
| 9,656,606 B1* | 5/2017 | Vose | B60Q 9/008 |
| 9,672,719 B1 | 6/2017 | Hollenstain et al. | |
| 9,756,474 B1 | 9/2017 | Knas et al. | |
| 9,922,374 B1* | 3/2018 | Vose | B60Q 9/008 |
| 10,001,381 B2* | 6/2018 | Akaho | G01C 21/26 |
| 10,241,509 B1* | 3/2019 | Fields | A61B 5/4094 |
| 2005/0197771 A1* | 9/2005 | Seick | G08G 1/163 |
| | | | 701/301 |
| 2011/0077028 A1* | 3/2011 | Wilkes, III | B60W 50/14 |
| | | | 455/456.3 |
| 2012/0123806 A1* | 5/2012 | Schumann, Jr. | G06Q 40/08 |
| | | | 705/4 |
| 2012/0310485 A1 | 12/2012 | Lang et al. | |
| 2013/0046562 A1* | 2/2013 | Taylor | G06Q 40/00 |
| | | | 705/4 |
| 2014/0172287 A1* | 6/2014 | Ando | G08G 1/09675 |
| | | | 701/301 |
| 2014/0236414 A1* | 8/2014 | Droz | G08G 1/161 |
| | | | 701/28 |
| 2014/0266655 A1* | 9/2014 | Palan | G06K 9/00805 |
| | | | 340/435 |
| 2014/0278047 A1* | 9/2014 | Bahl | G08G 1/164 |
| | | | 701/301 |
| 2015/0343947 A1* | 12/2015 | Bernico | B60Q 9/00 |
| | | | 340/436 |
| 2016/0358081 A1* | 12/2016 | Cama | G06F 16/29 |
| 2017/0053461 A1* | 2/2017 | Pal | G07C 5/008 |
| 2017/0160392 A1* | 6/2017 | Brisimitzakis | G01S 13/931 |
| 2017/0191847 A1* | 7/2017 | Chintakindi | H04W 4/44 |
| 2018/0075747 A1* | 3/2018 | Pahwa | B60W 40/09 |
| 2018/0079359 A1* | 3/2018 | Park | G01S 13/931 |
| 2018/0222473 A1* | 8/2018 | Shami | H04W 4/00 |

OTHER PUBLICATIONS

U.S. Appl. No. 15/862,507, "Final Office Action", dated Aug. 16, 2018, 7 pages.

* cited by examiner

500

OBTAINING A PLURALITY OF MEASUREMENTS FROM SENSORS OF A
MOBILE DEVICE IN A VEHICLE DURING A DRIVE
505

OBTAINING CONTEXTUAL DATA FOR THE PLURALITY OF MEASUREMENTS
510

GENERATING AN ACCIDENT LIKELIHOOD METRIC USING AT LEAST ONE
OF THE PLURALITY OF MEASUREMENTS OR THE CONTEXTUAL DATA
525

DISPLAYING THE ACCIDENT LIKELIHOOD METRIC
520

```
┌─────────────────────────────────────────────────────┐
│  OBTAIN A LOCATION MEASUREMENT FROM A LOCATION SENSOR│
│           OF A MOBILE DEVICE IN A VEHICLE           │
│                         610                          │
└─────────────────────────────────────────────────────┘
                            │
                            ▼
┌─────────────────────────────────────────────────────┐
│   IDENTIFY A TRAVEL ROUTE FOR THE VEHICLE, THE TRAVEL│
│   ROUTE BEGINNING AT A LOCATION INDICATED BY THE     │
│   LOCATION MEASUREMENT, HAVING A PLURALITY OF        │
│   WAYPOINTS, AND ENDING AT AN END POINT              │
│                         620                          │
└─────────────────────────────────────────────────────┘
                            │
                            ▼
┌─────────────────────────────────────────────────────┐
│  IDENTIFY ONE OR MORE PAST EVENTS ASSOCIATED WITH ONE│
│  OR MORE OF WAYPOINTS OF THE PLURALITY OF WAYPOINTS, │
│        RESULTING IN A DATASET OF PAST EVENTS         │
│                         630                          │
└─────────────────────────────────────────────────────┘
                            │
                            ▼
┌─────────────────────────────────────────────────────┐
│     IDENTIFY RISK INFORMATION ASSOCIATED WITH THE    │
│              VEHICLE AND THE MOBILE DEVICE           │
│                         640                          │
└─────────────────────────────────────────────────────┘
                            │
                            ▼
┌─────────────────────────────────────────────────────┐
│ ESTIMATE A LIKELIHOOD OF OCCURRENCE OF A FUTURE EVENT│
│ ON THE TRAVEL ROUTE, THE FUTURE EVENT ASSOCIATED WITH│
│ THE VEHICLE AND THE MOBILE DEVICE, THE ESTIMATING    │
│ BASED ON THE DATASET OF PAST EVENTS AND THE RISK     │
│ INFORMATION                                          │
│                         650                          │
└─────────────────────────────────────────────────────┘
```

┌─────────────────────────────────────────────────┐
  │ OBTAIN A COLLECTION OF MOVEMENT MEASUREMENTS FROM A │
  │    MOBILE DEVICE IN A VEHICLE, EACH MOVEMENT     │
  │   MEASUREMENT ASSOCIATED WITH A GEOGRAPHIC LOCATION │
  │                       710                        │
  └─────────────────────────────────────────────────┘
                          │
                          ▼
  ┌─────────────────────────────────────────────────┐
  │           IDENTIFY A DECELERATION THRESHOLD      │
  │                       720                        │
  └─────────────────────────────────────────────────┘
                          │
                          ▼
  ┌─────────────────────────────────────────────────┐
  │  DETERMINE A DECELERATION MEASUREMENT FOR A FIRST│
  │   SUBSET OF THE COLLECTION OF MOVEMENT MEASUREMENTS │
  │                       730                        │
  └─────────────────────────────────────────────────┘
                          │
                          ▼
  ┌─────────────────────────────────────────────────┐
  │ IDENTIFY A FIRST EVENT ASSOCIATED WITH THE FIRST SUBSET │
  │   WHEN THE DECELERATION MEASUREMENT EXCEEDS THE  │
  │              DECELERATION THRESHOLD              │
  │                       740                        │
  └─────────────────────────────────────────────────┘
```

*FIG. 7*

SYSTEMS AND METHODS FOR SENSOR-BASED VEHICLE CRASH PREDICTION, DETECTION, AND RECONSTRUCTION

CROSS-REFERENCES TO RELATED APPLICATIONS

This applications claims the benefit of U.S. Provisional Patent Application No. 62/287,251, filed Jan. 26, 2016, entitled "METHODS AND SYSTEMS FOR PREDICTING, DETECTING AND ASSESSING VEHICLE ACCIDENTS", and U.S. Provisional Patent Application No. 62/383,839, filed Sep. 6, 2016, entitled "SYSTEMS AND METHODS FOR VEHICLE CRASH PREDICTION, DETECTION, AND RECONSTRUCTION", both of which are hereby incorporated by reference in their entireties.

BACKGROUND OF THE INVENTION

Mobile devices, including smart phones, have been utilized to provide location information to users. Mobile devices can use a number of different techniques to produce location data. One example is the use of Global Positioning System (GPS) chipsets, which are now widely available, to produce location information for a mobile device. Some systems have been developed to track driving behaviors including speed, braking, and turn speed. Such systems include external devices that have been physically integrated with vehicles to track driving behavior. However, little has been done to help drivers and other interested parties predict, detect, and reconstruct vehicle accidents (also referred to herein as "crashes" or "collisions").

SUMMARY OF THE INVENTION

Despite the progress made in relation to collecting data related to drivers and their driving behavior, there is a need in the art for improved systems and methods related to predicting, detecting, and reconstructing vehicle accidents using a mobile device.

Embodiments of the present invention relate to transportation systems. More particularly, embodiments relate to methods and systems of vehicle data collection by a user having a mobile device. In a particular embodiment, vehicle data, such as vehicle movement data (also termed herein "driving data" or "data") is collected, analyzed and transformed, and combinations of collected data and transformed data are used in different ways, including, but not limited to, predicting, detecting, and reconstructing vehicle accidents.

One important use for collected, analyzed and transformed driving data is the categorization and output of the data. Some embodiments described herein break down collected driving data into discrete collections of data (e.g., trips) and categorize both the whole set of data and the discrete collections of data. Some embodiments analyze the driving data and identify specific events that are likely to have occurred during a drive, and the likely occurrence of these events are used by some embodiments to provide additional ways to group, categorize and/or output results.

According to some embodiments of the invention, a method of predicting vehicle accidents is provided. The method comprises obtaining a plurality of measurements from one or more sensors of a mobile device in a vehicle during a drive. The method further comprises obtaining contextual data for the plurality of measurements. The method further comprises generating an accident likelihood metric using at least one of the plurality of measurements or the contextual data. The accident likelihood metric represents a likelihood that the vehicle will be involved in an accident during the drive. The method further comprises displaying the accident likelihood metric on the mobile device.

According to some embodiments of the invention, a method of detecting vehicle accidents is provided. The method comprises obtaining a plurality of measurements from a sensor of a mobile device in a vehicle during a drive. The method further comprises obtaining an accident threshold value for the sensor. The accident threshold value represents a minimum value obtained from the sensor that is indicative of an accident. The method further comprises identifying a measurement in the plurality of measurements that exceeds the accident threshold value. The method further comprises determining a fixed duration window corresponding to a first portion of the drive. The first portion of the drive includes a first subset of the plurality of measurements. The first subset of the plurality of measurements includes the identified measurement. The method further comprises processing the first subset of the plurality of measurements to determine a variable duration window corresponding to a second portion of the drive within the first portion of the drive. The second portion of the drive includes a second subset of the first subset of the plurality of measurements. The second subset also includes the identified measurement. The method further comprises analyzing the second subset to identify an accident in the vehicle during the drive.

According to some embodiments of the invention, a method of reconstructing vehicle accidents is provided. The method comprises obtaining a plurality of measurements from a sensor of a mobile device in a vehicle during a drive. The method further comprises identifying an accident in the vehicle during the drive from the plurality of measurements. The method further comprises identifying an accident time associated with the accident. The method further comprises at least one of: (A) analyzing the plurality of measurements obtained before the accident time to identify at least one prior event, (B) analyzing the plurality of measurements obtained during the accident time to identify at least one concurrent event, or (C) analyzing the plurality of measurements obtained after the accident time to identify at least one subsequent event.

Other embodiments of the invention are directed to a system comprising a processor and memory coupled to the processor. The memory stores instructions, which when executed by the processor, cause the system to perform operations including the steps of the above methods.

According to some embodiments, a computer-program product is provided. The computer-program product is tangibly embodied in a non-transitory machine-readable storage medium of a device. The computer-program product includes instructions that, when executed by one or more processors, cause the one or more processors to perform operations including the steps of the above method.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 5 is a flowchart illustrating a method of predicting vehicle accidents according to an embodiment of the present invention.

FIG. 6 is flowchart illustrating a method for determining the likelihood of events on travel routes according to an embodiment of the present invention.

FIG. 7 is a flowchart illustrating a method of identifying occurrences of events associated with vehicles according to an embodiment of the present invention.

Figure 1:
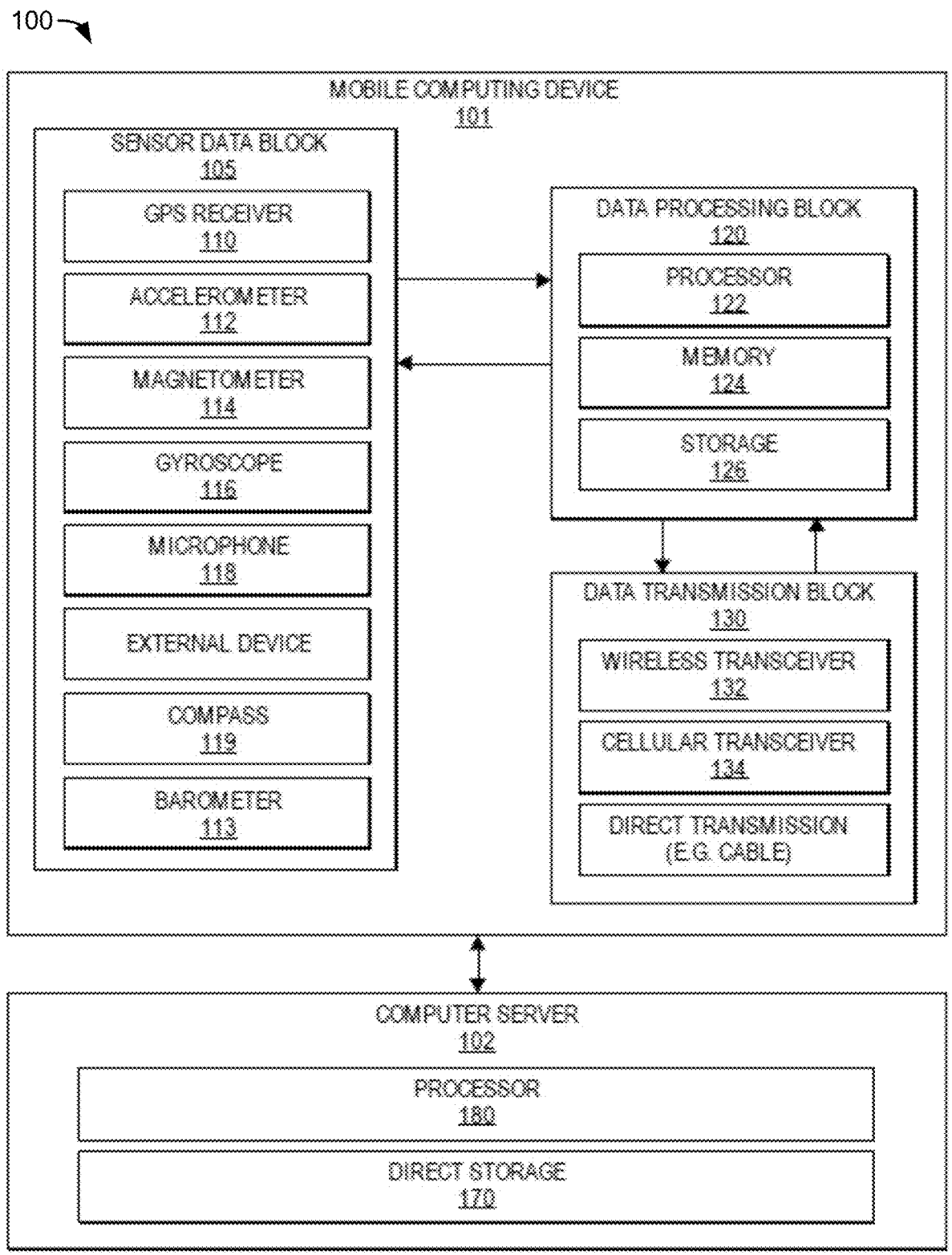
FIG. 1 is a simplified system diagram illustrating a driving behavior tracking system using a mobile device according to an embodiment of the present invention.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF SPECIFIC EMBODIMENTS

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Embodiments of the present invention utilize mobile devices to provide information on a user's behaviors during transportation. For example, a mobile device carried by a user could be used to analyze driving behavior, which is of interest for a variety of applications.

As discussed below, some embodiments described herein use approaches to collecting and analyzing driving data similar to the approaches described in U.S. patent application Ser. No. 15/149,603, filed May 9, 2016, entitled "METHODS AND SYSTEMS FOR SENSOR-BASED VEHICLE ACCELERATION DETERMINATION," (the '603 application), U.S. patent application Ser. No. 15/149,613, filed May 9, 2016, entitled "METHODS AND SYSTEMS FOR SENSOR-BASED DRIVING DATA COLLECTION" (the '613 application), and U.S. patent application Ser. No. 14/749,232, filed Jun. 24, 2015, entitled "METHODS AND SYSTEMS FOR ALIGNING A MOBILE DEVICE TO A VEHICLE" (the '232 application), U.S. patent application Ser. No. 15/249,967, filed Aug. 29, 2016, entitled "METHODS AND SYSTEMS FOR PRESENTING COLLECTED DRIVING DATA," (the '967 application), U.S. patent application Ser. No. 15/268,049, filed Sep. 16, 2016, entitled "METHODS AND SYSTEMS FOR DETECTING AND ASSESSING DISTRACTED DRIVERS," (the '049 application), U.S. patent application Ser. No. 15/353,340, filed Nov. 16, 2016, entitled "METHODS AND SYSTEMS FOR COMBINING SENSOR DATA TO MEASURE VEHICLE MOVEMENT", these applications being incorporated by reference herein in their entireties for all purposes ("the Incorporated Applications").

Specific examples of the use of different embodiments disclosed in the Incorporated Applications are provided herein, and it is contemplated that additional approaches described in these applications can be used by some embodiments described herein.

FIG. 1 is a simplified system diagram illustrating a system 100 for collecting and processing vehicle movement data according to an embodiment of the present invention. Some embodiments use vehicle movement data to detect the occurrence of events associated with the vehicle, e.g., an accident. System 100 includes a mobile device 101 having a number of different components. Mobile device 101 includes a sensor data block 105, a data processing block 120, and a data transmission block 130. The sensor data block 105 includes data collection sensors as well as data collected from these sensors that are available to mobile device 101, this can include external devices connected via Bluetooth, USB cable, etc. The data processing block 120 includes storage 126, and manipulations done to the data obtained from the sensor data block 105 includes, but is not limited to, subsampling, filtering, reformatting, etc. Data transmission block 130 includes any transmission of the data off the phone to an external computing device that can also store and manipulate the data obtained from sensor data block 105.

Some embodiments of the present invention are described using examples where vehicle movement data is collected using mobile devices 101, these examples not being limited to any particular mobile device, e.g., a variety of mobile devices include sensors that can detect movement (also termed "movement sensors"), such as accelerometers 112, gyroscopes 116, compasses 119, barometers 113. Location determination systems (also termed "location sensors") such as global positioning system (GPS) receivers 110 can also be included. Example mobile devices include smart watches, fitness monitors, Bluetooth headsets, tablets, laptop computers, smart phones, music players, movement analysis devices, and other suitable devices. One of ordinary skill in the art, given the description herein, would recognize many variations, modifications, and alternatives for the implementation of embodiments.

To collect data associated with vehicle movement, one or more sensors on mobile device 101 (e.g., the sensors of sensor data block 105) are operated close in time to a period when mobile device 101 is with the driver when operating a vehicle—also termed herein "a drive." With many mobile devices 101, the sensors used to collect data are components of the mobile device 101, and use power resources available to mobile device 101 components, e.g., mobile device battery power and/or a data source external to mobile device 101.

Some embodiments use settings of a mobile device to enable different functions described herein. For example, in Apple IOS, and/or Android OS, having certain settings enabled can enable certain functions of embodiments. For some embodiments, having location services enabled allows the collection of location information from the mobile device (e.g., collected by global positioning system (GPS) sensors, and enabling background app refresh allows some embodiments to execute in the background, collecting and analyzing driving data even when the application is not executing.

FIG. 1 also shows a computer server 102 that communicates with mobile device 101. In some embodiments, server 102 provides functionality using components including, but not limited to processor 180. Server 102 also includes data storage 170. It is important to note that, while not shown, one or more of the components shown operating using server 102 can operate using mobile device 101. Processor 180 can perform some or all of the processing of the collected movement measurement described below, and direct storage 170 can store the collected movement data, as well as the results of processing described herein.

To collect data associated with the movement of a vehicle, one or more sensors on mobile device 101 (e.g., the sensors of sensor data block 105) are operated close in time to a period when mobile device 101 is with the driver when operating a vehicle—also termed herein "a drive" or "a trip". Once the mobile device sensors have collected data (and/or in real time), some embodiments analyze the data to determine movement measurements. As discussed below, some embodiments analyze movement measurements (also termed herein "driving data") to detect events (also termed herein "driving events"). Analysis and processing of the collected data, as described herein, may occur on mobile device 101 and/or on server 102.

Figure 2:
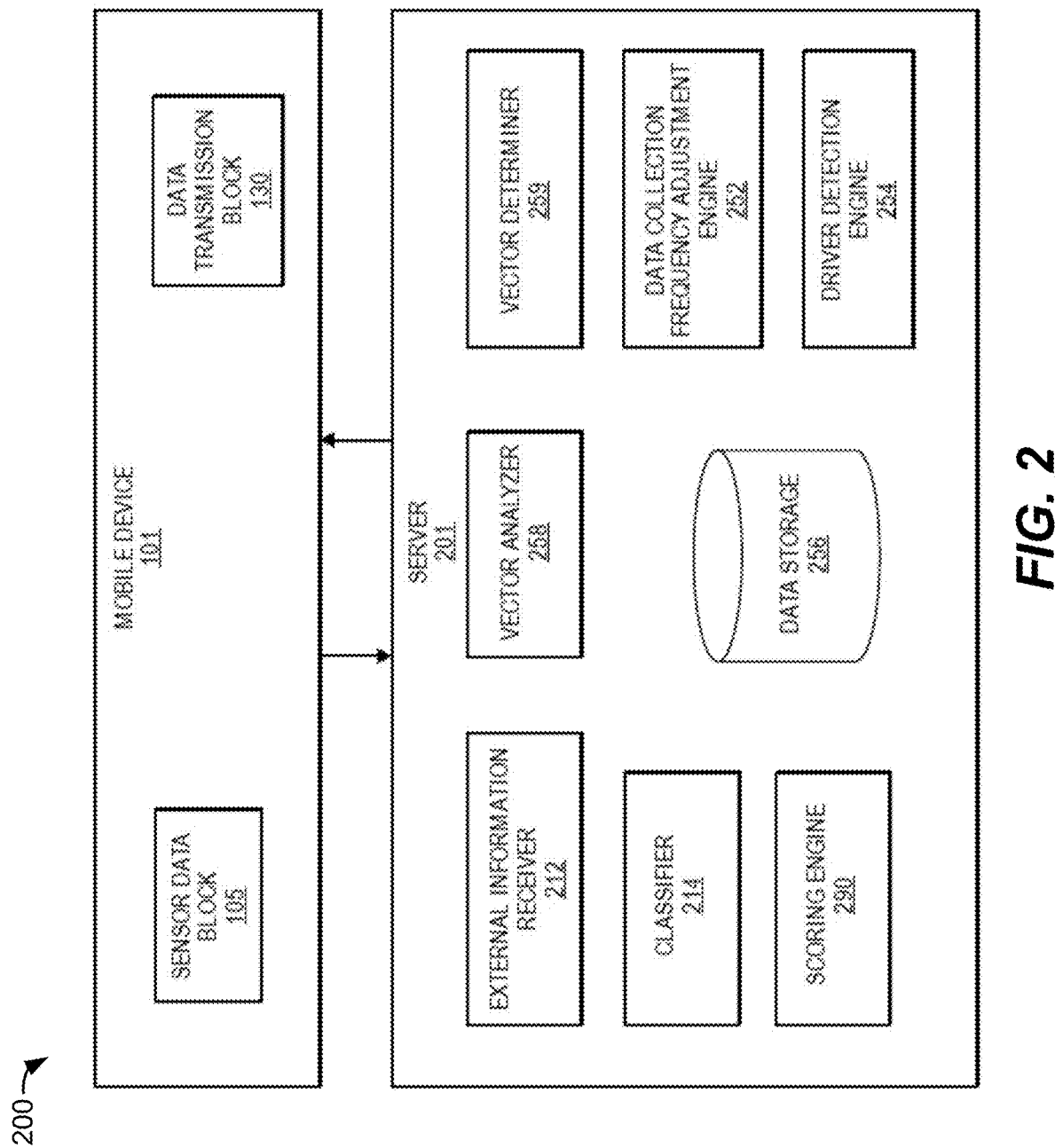
FIG. 2 is a simplified system diagram illustrating a driving behavior tracking system using a server according to an embodiment of the present invention.

FIG. 2 shows a system 200 for collecting driving data that can include a server 201 that communicates with mobile device 101. In some embodiments, server 201 may provide functionality using components including, but not limited to vector analyzer 258, vector determiner 259, external information receiver 212, classifier 214, data collection frequency engine 252, and driver detection engine 254. These components are executed by processors (not shown) in conjunction with memory (not shown). Server 201 may also include data storage 256. It is important to note that, while not shown, one or more of the components shown operating within server 201 can operate fully or partially within mobile device 101, and vice versa.

To collect data associated with the driving behavior of a driver, one or more sensors on mobile device 101 (e.g., the sensors of sensor data block 105) may be operated close in time to a period when mobile device 101 is with the driver when operating a vehicle—also termed herein "a drive" or "a trip". Once the mobile device sensors have collected data (and/or in real time), some embodiments analyze the data to determine acceleration vectors for the vehicle, as well as different features of the drive. Exemplary processes detect and classify driving features using classifier 214, and determine acceleration vectors using vector analyzer 258 and vector determiner 259. In some embodiments, external data (e.g., weather) can be retrieved and correlated with collected driving data.

As discussed herein, some embodiments can transform collected sensor data (e.g., driving data collected using sensor data block 105) into different results to analyze movement measurements and to detect the occurrence of driving events. Although shown and described as being contained within server 201, it is contemplated that any or all of the components of server 201 may instead be implemented within mobile device 101, and vice versa. It is further contemplated that any or all of the functionalities described herein may be performed during a drive, in real time, or after a drive.

Examples of collecting driving data using sensors of a mobile device are described herein and in the Incorporated Applications. Examples of analyzing collected driving data to detect the occurrence of driving events are also described herein and in the Incorporated Applications.

I. Accident Prediction

Figure 3:
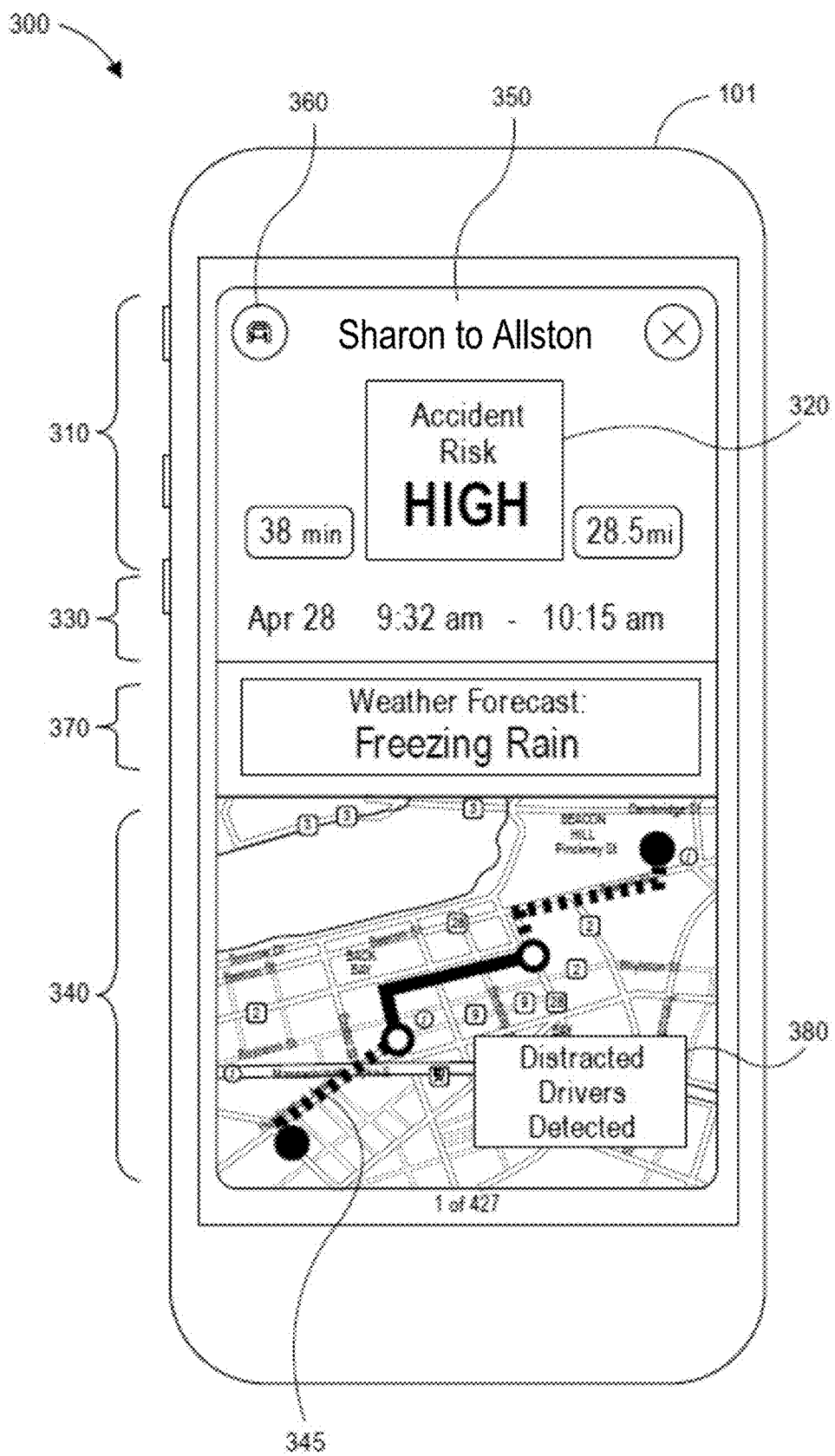
FIG. 3 is an exemplary user interface for predicting vehicle accidents according to an embodiment of the present invention.

FIG. 3 depicts a mobile device 101 having an example user interface that highlights features of some embodiments. Some embodiments use the approach to assess vehicle movement by having a mobile computing device (e.g., mobile device 101) associated with a driver in a vehicle during a drive. The specifics of the use of movement measurements by embodiments are discussed with the description of FIG. 8 below, in an accident detection description.

The example discussed in FIG. 3 is associated with the prediction of the occurrence of a vehicle event (also termed herein, an "event" and an "event prediction") and notification of a driver of an event prediction. In an example use, a driver brings mobile device 101 (also termed a "device" herein) into a vehicle. In an example process similar to the use of a GPS for trip instructions, the driver specifies a trip route (herein a "travel route" or "route"). As would be appreciated by one having skill in the relevant art(s), given the description herein, embodiments can identify a travel route in a variety of ways, e.g., receiving from another application (e.g., GPS trip directions), retrieving stored routes, and/or other approaches.

As shown in FIG. 3, route 345 is displayed in map 340, with the starting and ending points displayed at 350. Some embodiments display the mode of travel 360 along with the length of the route, the estimated time to complete the route (not labeled), the weather 370 along the route, and the time of day 330 that the route will be taken. As discussed with FIG. 4 below, these values, along with other information, can be used by some embodiments to estimate the likelihood of the driver having a particular event occur (e.g., a vehicle accident) along the route during the time specified. In other embodiments, event likelihood estimates can be determined using that are less specific to a route and/or a time of day, e.g., the an estimate can be determined that reflects a likelihood of having an event in general that day, on any local road.

Once determined, likelihood values can be displayed for the driver on an application running on the mobile computing device (e.g., Accident Risk 320 displayed). In addition, some embodiments can notify a user of the potential for distracted drivers 380 along route 345. This potential can be determined, for example, from other instances of embodiments executing in other vehicles traveling along route 345. Using approaches, described for example in the Incorporated Applications, for determining distracted drivers, some embodiments can aggregate driving information collected from other drivers while maintaining the privacy of information collected and/or determined by embodiments. For convenience, as used herein, inattentiveness, distraction, failing to pay attention, and/or other similar terms and phrases broadly signify a driver not paying proper attention to tasks associated with safely operating the vehicle.

A. Example Factors Used to Predict Accidents

With an identified route 345, some embodiments identify one or more of the following items A1-A9 for use in determining the likelihood of an event (e.g., a vehicle accident) occurring. For convenience, a vehicle accident is referenced herein as an event considered by some embodiments, but it should be noted that the discussion of vehicle accident events can also apply to other types of events.

In some embodiments, some of items A1-A9 are identified after being received from an external information source. An additional discussion of using external data sources is found in the Incorporated Applications (e.g., grading the severity of a hard braking event was by cross-referencing the event with the weather, time of day, school zone, etc.). Items A1-A9 are as follows:

A1. The time and day of the year/week route 345 will be used: Knowing the time of day that a drive will occur allows some embodiments to estimate the likelihood of a vehicle accident considering time-associated factors, e.g., morning sleepiness, after lunch lethargy, night-time intoxicated drivers, and/or the effects of darkness on driving safety. Using the time of the year allows some embodiments to consider holiday times, and/or seasons of the year. Using the day of the week enables some embodiments to consider "Monday blues," Friday afternoon eagerness and/or Saturday night intoxicated drivers, and the increased risks these factors cause to individual drivers.

A2. Weather forecasts during time 330 for areas along the route 345: This information helps to determine the risk of a vehicle accident by considering the potential for adverse weather conditions, e.g., snow, ice, high winds, flooding, etc. In some embodiments, the forecast may be tailored to the expected time interval of the drive, e.g., a forecast for starting point 305 at 9:32 AM and a forecast for ending point 306 for 10:15 AM (these example times shown in FIG. 3 at time 330). These weather forecasts can be included in the user interface, e.g., weather 370.

A3. Historical weather information for the route: This information helps to fill in gaps in weather forecast A1, and/or account for unexpected weather conditions.

A4. Traffic congestion predicted to be on route 345: This information helps to determine the risk of a vehicle accident by considering the amount of vehicles on the route, frustration level of drivers, and/or other negative effects that would be known to one having skill in the relevant art(s), given the description herein.

A5. The presence of construction along route 345: Similar to traffic congestion (A4), this factor can affect the accident risk on the route.

A6. Historical Accident Data for route 345: In some embodiments, historical accident data can be used, alone, or along with other factors, to estimate the likelihood of a future accident. This data can be used, by some embodiments, to identify specific locations along the route that have a relatively higher likelihood of a vehicle accident occurring.

A7. Features of Route 345: Some embodiments receive information about route features (curves, hills, intersections, bridges, and/or other features), which can be used to estimate the likelihood of an accident along the route. These features can also include aspects that are near route 345, e.g., the population and demographics of the neighborhoods on route 345, and/or the amount of commercial activity in an area.

A8. Occurrences of distracted driving by others: As noted above, some embodiments can aggregate information among several instances of embodiments. For example, the detection of distracted driving behavior along the route by other drivers can indicate a higher likelihood of accidents on the route. It should be appreciated that any other detected behavior by other drivers can also be aggregated and used to estimate risk, e.g., hard stops and acceleration, excessive lateral acceleration on turns (also termed "sharp" turns), and/or other driving behaviors.

A9. Patterns associated with route 345 and/or the driver: In some embodiments, one or more of the factors discussed herein can be analyzed to determine whether any patterns of features exist that appear to lead to accidents. For example, a pattern could be: when it's snowing (A2) on a congested road (A4) after dark (A1), a distracted driver (A8) has a relatively high likelihood of having an accident on a particular turn (A7). In addition to using the combination of features in a determination of the likelihood of an accident occurring, some embodiments can select one or more of the pattern components to highlight to the driver. For the above pattern, a driver could be notified to "pay extra attention today," and/or "be careful in the snow." In addition, a marker could be placed on map 340 to highlight different pattern elements, e.g., a type of dangerous turn that a particular driver has had difficulty with in the past.

One having skill in the relevant art(s), given the description herein, will appreciate the broad variety of additional data sources can be combined with other data to estimate the likelihood of a vehicle accident in different circumstances.

To provide additional information for predicting vehicle accidents along route 345, some embodiments identify additional items of information about the driver of the vehicle. The following items B1-B4 are used by some embodiments to determine the likelihood of a vehicle accident occurring. In some embodiments, some of B1-B4 are identified after being received from an external information source, and in some embodiments some of B1-B4 are determined based information stored within server 102 and/or server 201.

B1. Past general driving behavior of the Driver: As described in the Incorporated Applications, driving behavior can be collected by some embodiments, e.g., using the sensors of mobile device 101. For example, the driver may have rapid starts and stops, exceed speed limits, and have lateral acceleration measurements that exceed thresholds, one or more of which can be indicative of a driver with a higher likelihood of a vehicle accident. General driving behavior describes behavior of a user over different types of routes.

B2. Driving behavior of the driver over route 345: In some embodiments, when a driver has driven route 345 before, the driving behavior of the driver is analyzed, and this is included in an analysis of future vehicle accidents for this driver on the route. For example, route 345 may include a difficult turn that has caused accidents for other drivers in the past. In this example, when the driver drives route 345 in the past, data was collected that is indicative of safe driving behavior on this turn. Thus, when the likelihood of a vehicle accident for route 345 is estimated, the significance of this turn can be reduced based on the previous safe behavior.

B3. Demographics of the driver: Driver demographics, e.g., gender, age, marital status, etc. can affect the likelihood of an accident occurring.

B4. Past distracted driving events of the driver: As discussed above, and in the Incorporated Applications, some embodiments can detect distracted driving by the driver. This distracted driving can be used by some embodiments to predict future accidents.

Figure 4:
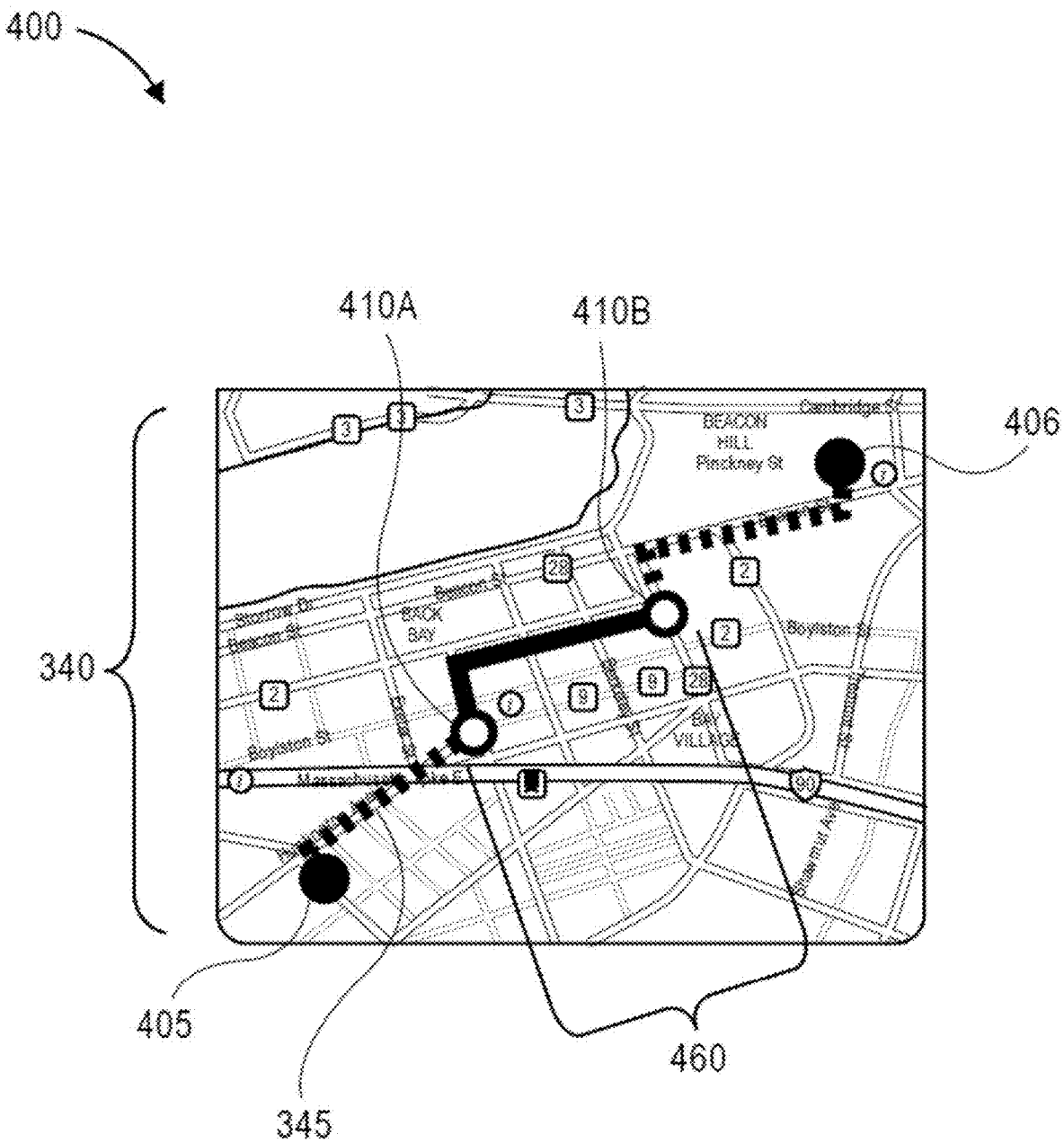
FIG. 4 is an exemplary route on a map that may be used for predicting vehicle accidents according to an embodiment of the present invention.

FIG. 4 depicts a more detailed example of map 340 having route 345 from FIG. 3. An example route 345 from points 405 to 406 is shown in an example graphical user interface (GUI) with display elements used by some embodiments. Illustrating processes discussed with FIG. 3 above, FIG. 4 shows geographic area 340 with a route 345 having starting point 405 and ending point 406. In some embodiments, starting point 405 is identified by GPS in the mobile device 101, and ending point 406 is identified as the end of the identified route.

Some embodiments identify one or more items of data described above (e.g., A1-A9 and B1-B4) and use a combination of the items to estimate the probability (also termed herein, "likelihood") of an event (e.g., a vehicle accident) occurring. One having skill in the relevant art(s), given the description herein, would appreciate how statistical analysis is used by some embodiments to determine the likelihood of a vehicle accident generally during travel along route 345, and/or specific points along route 345.

In some embodiments, points along route 345 that have a relatively high likelihood of accidents (e.g., a likelihood above a threshold), can be labeled as danger points. On the depicted drive in FIG. 4, danger points 410A and 410B are shown. In addition, a highlighted area 460 is shown with a distinctive color in the GUI. In this example, this whole region 460 is determined to have a higher probability of accidents, e.g., because of detected distracted driving along this segment of road, dangerous road conditions, and/or road construction.

FIG. 5 is a flowchart 500 illustrating a method of predicting vehicle accidents according to an embodiment of the invention. At step 505, a plurality of measurements are obtained from sensors of a mobile device in a vehicle during a drive. The mobile device may be, for example, mobile device 101 of FIG. 1. The sensors may include any or all of the sensors contained in the mobile device. In some embodiments, the measurements may include GPS measurements.

At step 510, contextual data for the plurality of measurements is obtained. The contextual data may include, for example, weather data for the location where the plurality of measurements were obtained, road quality data for the road on which the plurality of measurements were obtained, traffic data for the road on which the plurality of measurements were obtained, unsafe driving path indicators for the road on which the plurality of measurements were obtained (e.g., based on historical accident rates, reported intensities of historical accidents, unsafe road characteristics such as steep hills or curves, etc.), unsafe driving time indicators for the time at which the plurality of measurements were collected (e.g., at night, at busy times such as holidays or rush hour, etc.), and the like. In some embodiments, contextual data may include a recommended route (that has not yet or is currently being taken) to a destination on a GPS.

At step 515, an accident likelihood metric is generated using at least one of the plurality of measurements or the contextual data. The accident likelihood metric represents a likelihood that the vehicle will be involved in an accident during the drive, either on the whole, at particular points, during particular actions (e.g., left turns), and/or on particular segments. The accident likelihood metric may be represented by any combination of letters, numbers, and/or symbols that indicate the probability of an accident occurring. For example, the accident likelihood metric could be represented by a scale between 0-100, a letter between A-F, a colored light (e.g., green, yellow, red), a smiling face versus a frowning face, etc., and combinations thereof.

In some embodiments, the accident likelihood metric is generated using only the plurality of measurements. For example, the accident likelihood metric may be generated based on sensed variation in lateral vehicle position (e.g., to determine if a vehicle is going off of the road), rumble strip detection (e.g., to determine if a vehicle is going off of the road), frequent and/or hard braking (e.g., indicative of heavy congestion and/or not keeping the proper distance from vehicles in front of the driver), distracted driving (e.g., sensed driver interaction with the mobile device while the vehicle is in motion), and the like.

In some embodiments, the accident likelihood metric is generated using only the contextual data. For example, the accident likelihood metric may be generated based on weather conditions (e.g., that impair visibility, that impair vehicle control, etc.), road quality (e.g., a bumpy road under construction), traffic alerts (e.g., particularly heavy traffic), an unsafe driving path (e.g., driving through a high accident intersection), an unsafe driving time (e.g., driving in the middle of the night), and the like.

In some embodiments, the accident likelihood metric is generated using both the plurality of measurements and the contextual data. For example, the accident likelihood metric may analyze both the weather (e.g., rainy weather) and any sensed driving adjustments due to the weather (e.g., use of windshield wipers, lowered speed, etc.). In another example, the accident likelihood metric may consider a traffic alert indicating light traffic, a sensed high rate of speed, and multiple sensed hard braking events, to conclude a high likelihood of an accident due to the driver following too closely.

In some embodiments, the accident likelihood metric may take into account driver specific data obtained from sources internal or external to the system described with respect to FIG. 1. This embodiment may be implemented alone or in combination with any of the embodiments described above. For example, the accident likelihood metric may take into account the past general driving behavior of the driver (e.g., past rapid accelerations, past hard brakes, past speeding, past distracted driving, etc.), past driving behavior of the driver on the same route (e.g., past safe turns at a high accident intersection), demographics of the driver (e.g., gender, age, glasses or contact lens wearer, etc.), and the like.

At step 520, the accident likelihood metric is displayed on the mobile device. In some embodiments, the accident likelihood metric is displayed graphically on a graphical user interface of the mobile device. In some embodiments, the accident likelihood metric is announced audibly (e.g., with words or an alarm) so as to avoid driver distraction or interaction with the mobile device. In some embodiments, the accident likelihood metric is conveyed tangibly, such as by vibrating when it is above a certain threshold.

FIG. 6 is a simplified flowchart showing a method for determining the likelihood of events for a vehicles traveling on travel routes. Method 600 begins at block 610 where a location measurement is obtained from a location sensor of a mobile device in a vehicle. In some embodiments, a location measurement (e.g., starting point 405) is obtained from a location sensor (e.g., GPS receiver 110) of a mobile device (e.g., mobile device 101) in a vehicle (e.g., vehicle 850 discussed below).

In block 620, a travel route is identified for the vehicle, the travel route beginning at a location indicated by the location measurement, having a plurality of waypoints, and ending at an end point. In some embodiments, a travel route (e.g., route 345) beginning at a location indicated by the location measurement (e.g., starting point 405), having a plurality of waypoints (e.g., danger points 410A and 410B), and ending at an end point (e.g., ending point 406).

In block 630, one or more past events associated with one or more of waypoints of the plurality of waypoints are identified, resulting in a dataset of past events. In some embodiments, one or more past events associated with one or more of waypoints of the plurality of waypoints are identified (e.g., factors A1-A9 retrieved from an external source by server 102), resulting in a dataset of past events (e.g., stored in data storage 170).

In block 640, risk information associated with the vehicle and the mobile device is identified. In some embodiments, risk information associated with the vehicle and the mobile device is identified (e.g., processor 180 can determine risk information based on data stored in data storage 170).

In block 650, a likelihood of occurrence of a future event on the travel route is estimated, the future event associated with the vehicle and the mobile device, the estimating based on the dataset of past events and the risk information. In some embodiments, a likelihood of occurrence of a future event on the travel route is estimated, the future event associated with the vehicle and the mobile device (e.g., mobile computing device 101), the estimating based on the dataset of past events and the risk information (e.g., by processor 180 using data stored in data storage 170).

II. Accident Detection

FIG. 7 is a simplified flowchart of a method of identifying occurrence of events associated with vehicles on travel routes. Method 700 begins at block 710 where a collection of movement measurements is obtained from a mobile device in a vehicle, each movement measurement associated with a geographic location. In some embodiments, a collection of movement measurements is obtained from a mobile device (e.g., sensors of mobile device 101) in a vehicle (e.g., vehicle 850), each movement measurement associated with a geographic location (e.g., points along route 345).

In block 720, a deceleration threshold is identified. In some embodiments, a deceleration threshold is identified (e.g., by processor 180 in computer server 102).

In block 730, a deceleration measurement is determined for a first subset of the collection of movement measurements. In some embodiments, the deceleration measurement is determined for a first subset of the collection of movement measurements (e.g., processor 180 analyzed movement measurements collected by sensors of mobile computing device 101).

In block 740, a first event associated with the first subset is identified when the deceleration measurement exceeds the deceleration threshold. In some embodiments, a first event associated with the first subset is identified when the deceleration measurement exceeds the deceleration threshold (e.g., by processor 180 of server 102).

Figure 8:
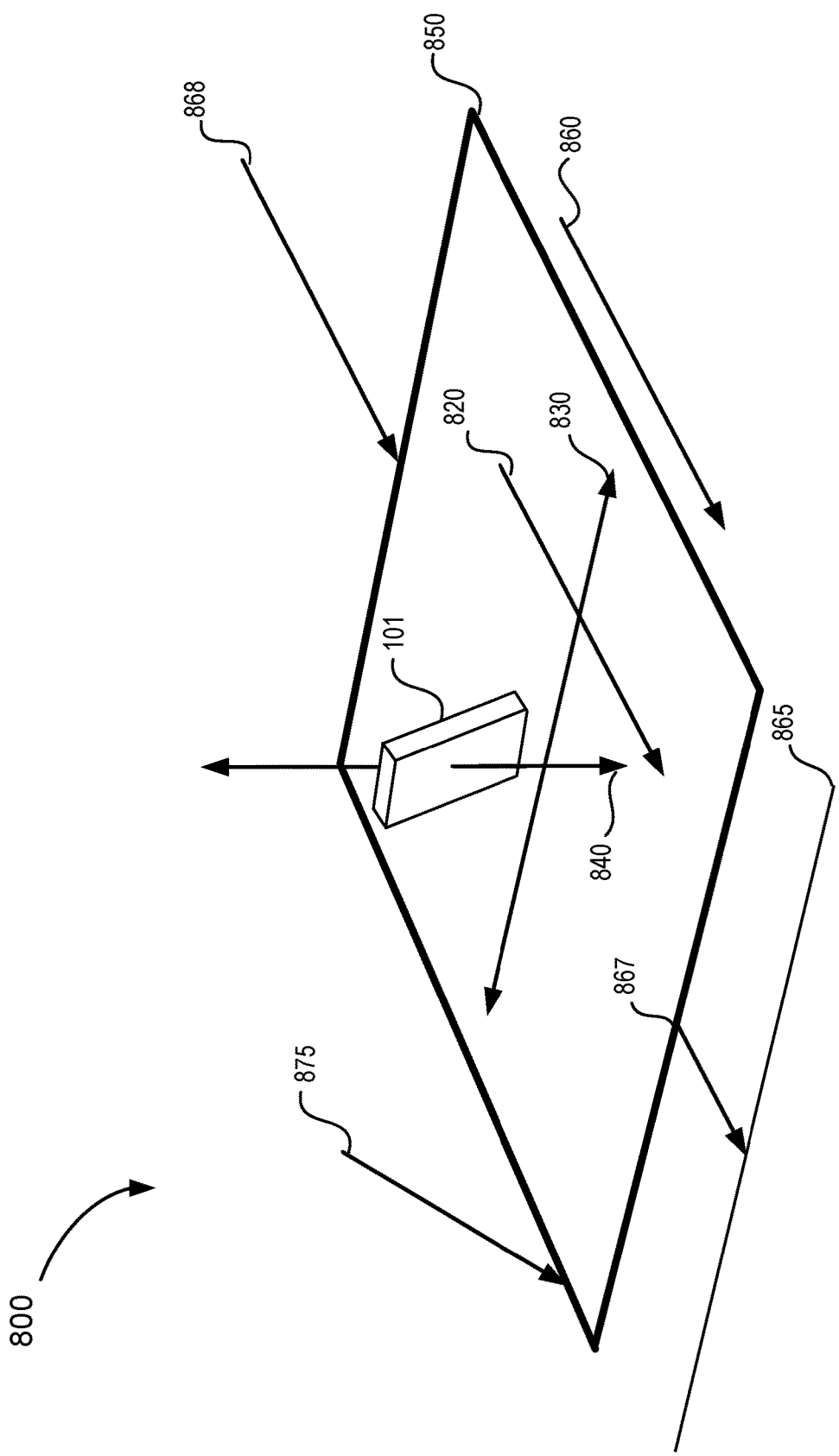
FIG. 8 is a simplified diagram of a mobile device in a vehicle according to an embodiment of the invention.

FIG. 8 is a simplified diagram 800 of a mobile device 101 in a vehicle 850, according to an embodiment. FIGS. 6 and 7 provide examples of different types of processes, used by some embodiments, to collect and analyze movement measurements from mobile device 101. FIG. 8 depicts a vehicle 850 having a driver (not shown) where mobile device 101 is used to provide movement measurements that enable detection and assessment of vehicle accidents.

In some embodiments, as described in the Incorporated Applications, using an extended Kalman filter applied to movement data from mobile device sensors, a gravity vector (e.g., gravity vector 840) for a mobile device (e.g., mobile device 101) in a moving vehicle (e.g., vehicle 850) moving in direction 860.

As shown in FIG. 8, vehicle 850 is traveling along vector 860, with forces measured by mobile device 101 measuring the movement of the vehicle. Mobile computing device 101 can measure a variety of different forces, e.g., forward acceleration 820 and lateral acceleration 830.

Mobile device 101 sensors can be used to detect accidents in a variety of ways.

According to embodiments of the present invention, the mobile device can measure events that have a large spike in acceleration and/or deceleration, for example, measured using GPS speed. As an example, for large accidents, the accelerometer output is scanned as a function of time to determine time stamps for which there are spikes in the acceleration of the mobile device accelerometer associated with speed decreases from above a threshold (e.g., 20 mph) to a speed close to zero. After the sudden deceleration, the speed remains near zero for an extended period of time, indicating that the car is immobilized in accordance with a large scale accident.

Because the mobile device is not fixed to the vehicle, the acceleration/deceleration patterns will be unique to the mobile device. As an example, in contrast with an accelerometer mounted in the vehicle, during an accident in which the mobile device is lying on the seat, the deceleration for the mobile device can lag the deceleration of the vehicle since the mobile device will move from the seat to an interior surface of the vehicle (e.g., a door or the firewall) before coming to a stop. As a result, the timing of the acceleration patterns and their characteristics will be unique to a mobile device. Moreover, the orientation of the mobile device can be used to map the accelerations measured using the mobile device to the frame of reference of the vehicle. The reference frame of the mobile device can be converted into the reference frame of the vehicle and then acceleration changes can be analyzed to detect an accident. The combination of the speed data and the accelerometer data can be utilized to filter out large accelerations/decelerations in which the vehicle speed does not change in a manner consistent with the large measured accelerations. An example would be hard braking that results in the phone sliding off the seat and crashing into the firewall, thereby generating a large acceleration, but the vehicle continues to move forward after the sudden stop.

Items C1-C4 provide examples of movement measurements that are indicative of different types of accidents:

C1. If vehicle 850 is stopped, and is struck from behind by another vehicle (e.g., along vector 868), sensors will initially detect no acceleration, then, most likely, a relatively high acceleration rate that vehicle 850 is unable to cause by normal driving forces. This acceleration reflects vehicle 850 being pushed ahead very quickly by the other vehicle.

C2. If vehicle 850, as a result of the rear-end accident described above is pushed along vector 867 into vehicle 865, initially sensors will detect no acceleration, then, a relatively rapid acceleration forward followed by a relatively rapid deceleration. Using this information, some embodiments can determine whether another vehicle struck vehicle 850 first and pushed vehicle 850 into vehicle 865. Some embodiments can also determine whether vehicle 850 struck vehicle 865 first, then vehicle 850 was struck by a vehicle from behind. One having skill in the relevant art(s), given the description herein, would appreciate that the information regarding the order that the three vehicles collided can be very valuable to the driver of vehicle 850.

C3. When vehicle 850 is struck at an angle (e.g., along vector 875), sensors can detect various results that can occur, e.g., a large jolt, then a spinning motion.

C4. When vehicle 850 is involved in a severe accident, often front, and/or side airbags may deploy. Some embodiments use sensors to first detect relatively rapid deceleration consistent with an accident. After the initial deceleration is detected, a distinctive "airbag deployment" set of forces are detected by sensors of mobile device 101.

Figure 9:
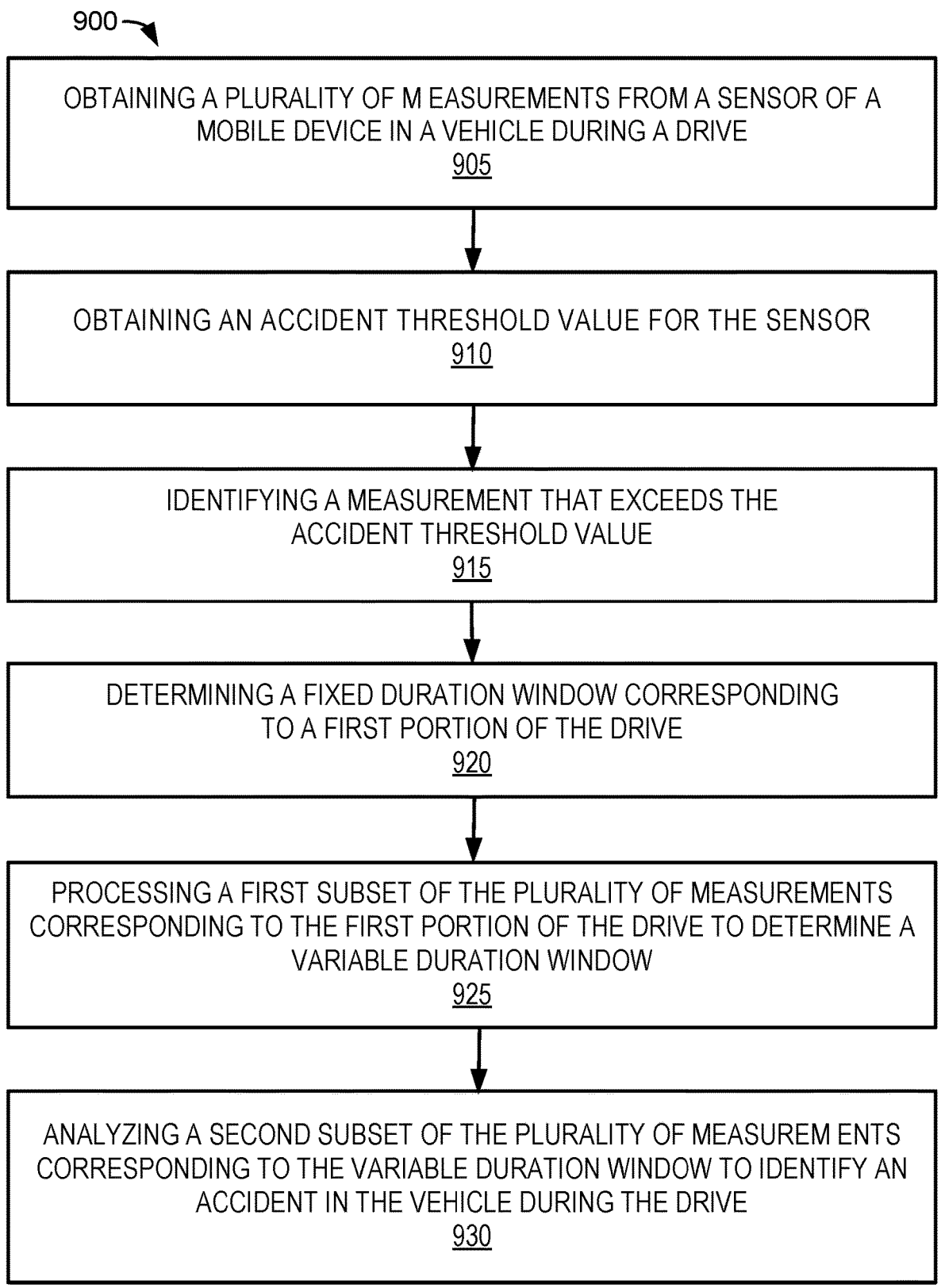
FIG. 9 is a flowchart illustrating a method of detecting vehicle accidents according to an embodiment of the invention.

FIG. 9 is a flowchart 900 illustrating a method of detecting vehicle accidents according to an embodiment of the invention. At step 905, a plurality of measurements are obtained from a sensor of a mobile device in a vehicle during a drive. The mobile device may be, for example, mobile device 101 of FIG. 1. The sensor may be any of the sensors contained in mobile device.

At step 910, an accident threshold value for the sensor is obtained. The accident threshold value represents a minimum value obtained from the sensor that is indicative of an accident. For example, the accident threshold value for an accelerometer may be 2 m/s². In another example, the accident threshold value for a magnetometer may be 70 microtesla. In still another example, the accident threshold value for a gyroscope may be 2.5 radian/second. In other words, the accident threshold value may be different depending on the type of sensor that is collecting the measurements during the drive, as each type of sensor may observe a different change in value during an accident.

Figure 10A:
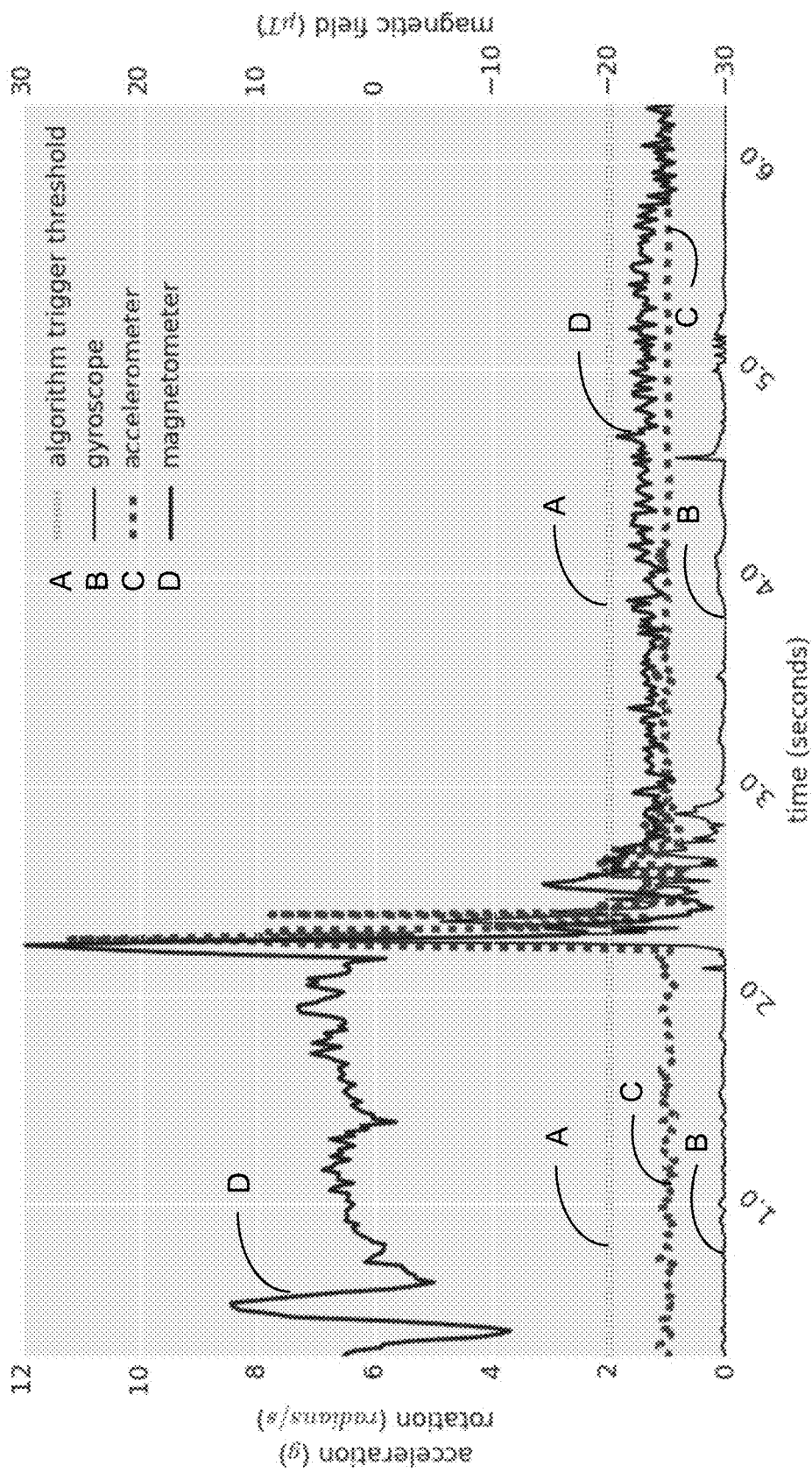
FIG. 10A is a graph illustrating sensor measurements during an accident as compared to an accident threshold value according to an embodiment of the present invention.

FIG. 10A is a graph illustrating sensor measurements during an accident as compared to an accident threshold value according to an embodiment of the present invention. In FIG. 10A, the accident threshold value is for an accelerometer. The accident threshold value is set at an acceleration value of approximately 2. For the accident illustrated in FIGS. 10A-10D, the phone was located in the left pant pocket of a passenger in the front seat and the car was oriented toward the front during the accident so that the impact was with the front of the car.

Turning back to FIG. 9, at step 915, a measurement is identified in the plurality of measurements that exceeds the accident threshold value. With respect to FIG. 10A, the measurement may be a measurement or multiple measurements exceeding the accident threshold value between approximately 2.2 and 2.4 seconds. In some embodiments, measurements from a magnetometer, accelerometer, and/or a gyroscope may exceed the accident threshold.

Turning back to FIG. 9, at step 920, a fixed duration window is determined that corresponds to a first portion of the drive. The first portion of the drive includes a first subset of the plurality of measurements, the first subset including the measurement(s) identified at step 915. In other words, a fixed duration of time (e.g., 5 seconds, 10 seconds, etc.) is determined that captures the measurement(s) identified as exceeding the accident threshold value, such that most or all of the measurements taken during the accident are within the fixed duration of time.

Figure 10B:
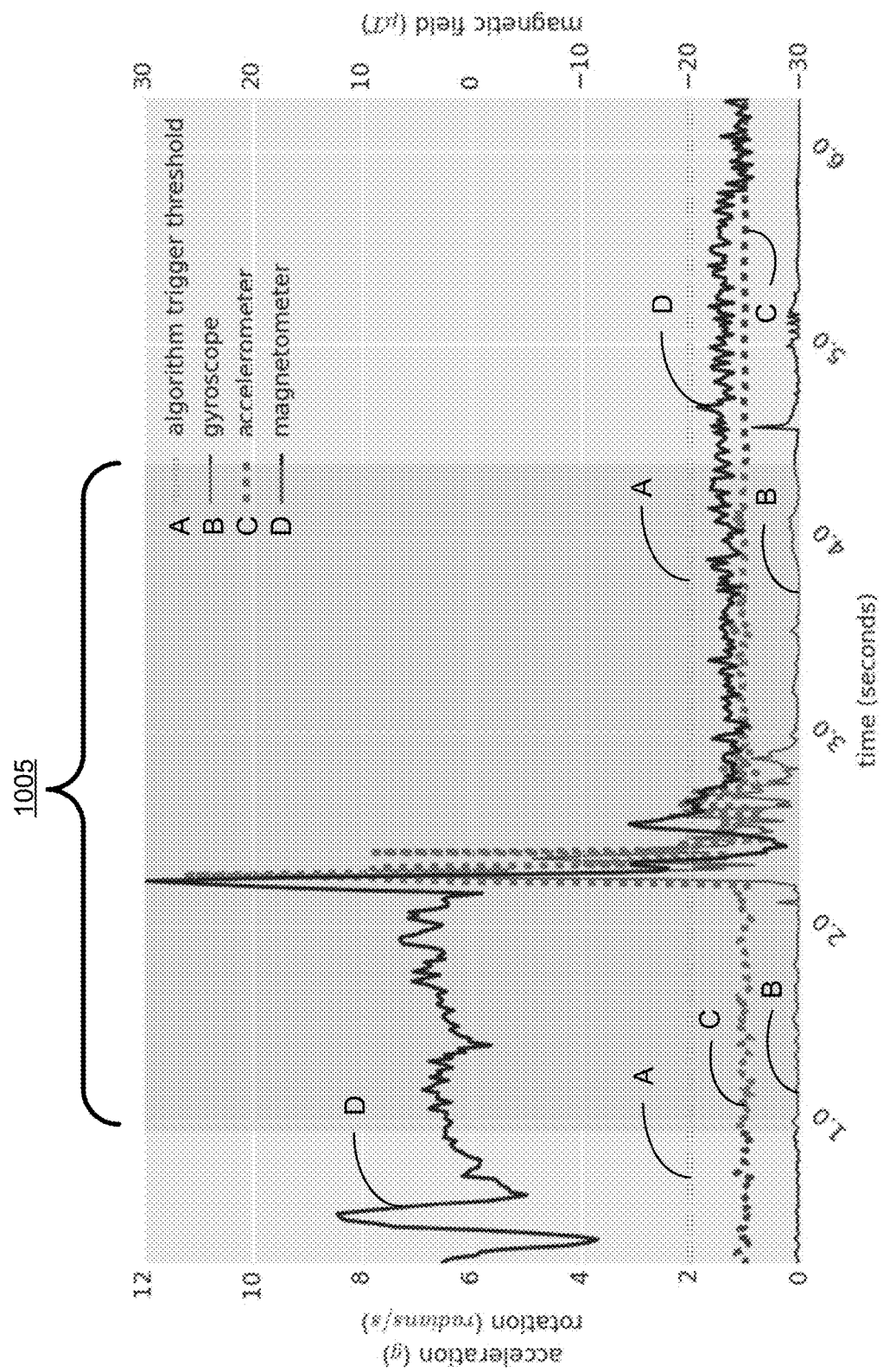
FIG. 10B is a graph illustrating sensor measurements during an accident within a fixed duration window according to an embodiment of the present invention.

FIG. 10B is a graph illustrating sensor measurements during an accident within a fixed duration window 1005 according to an embodiment of the present invention. As shown in FIG. 10B, the fixed duration window 1005 captures approximately 3.4 seconds of the plurality of measurements. Further, the fixed duration window 1005 appears to capture all of the accelerometer measurements above the accident threshold value. In other embodiments, however, the fixed duration window 1005 may be of any length, such as, for example, 10 seconds before and after a detected accident.

Figure 10C:
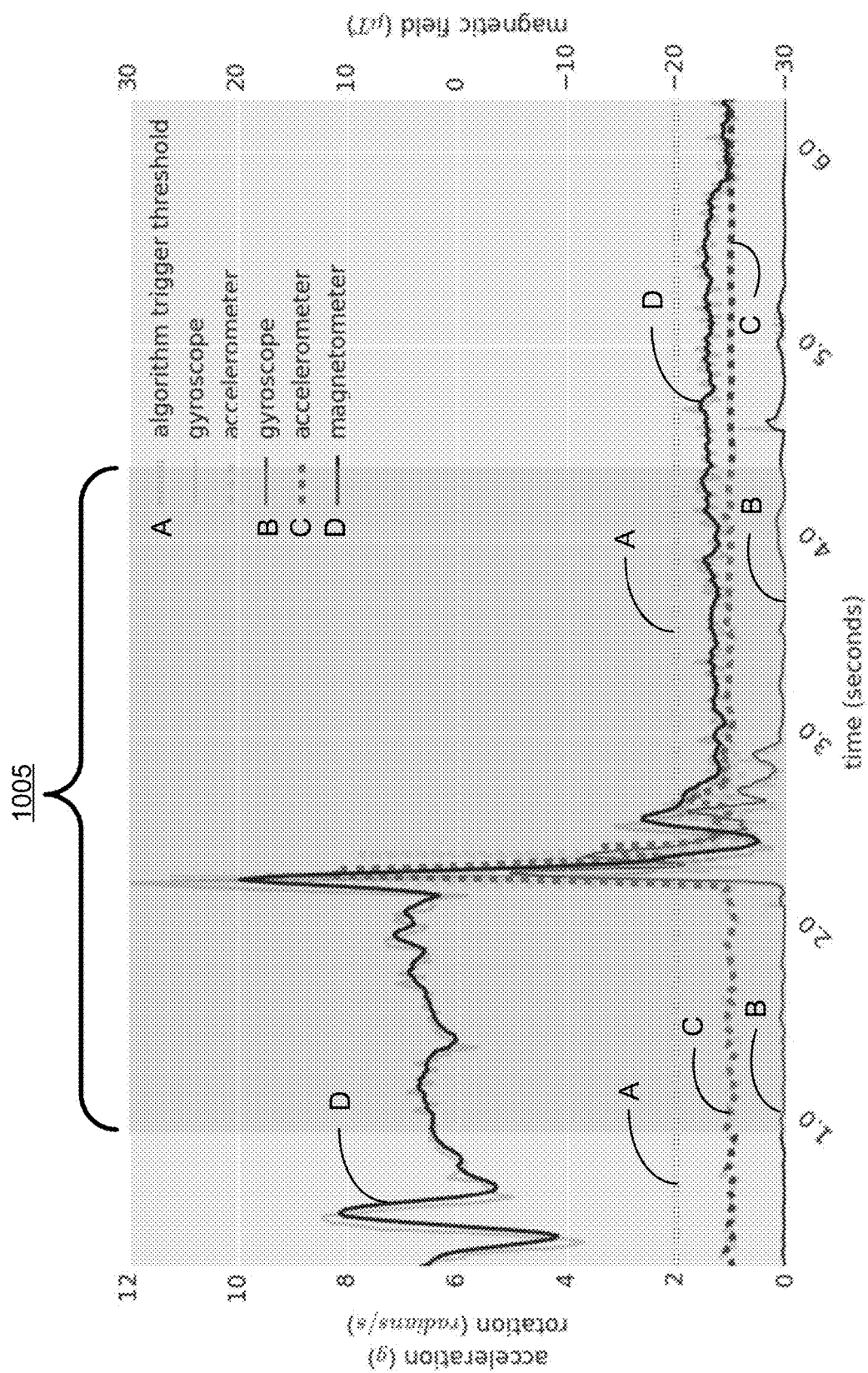
FIG. 10C is a graph illustrating sensor measurements during an accident that have been processed within a fixed duration window according to an embodiment of the present invention.

Turning back to FIG. 9, at step 925, the first subset of the plurality of measurements within the fixed duration window 1005 is processed. FIG. 10C is a graph illustrating sensor measurements during an accident that have been processed within the fixed duration window 1005 according to an embodiment of the present invention.

Figure 10D:
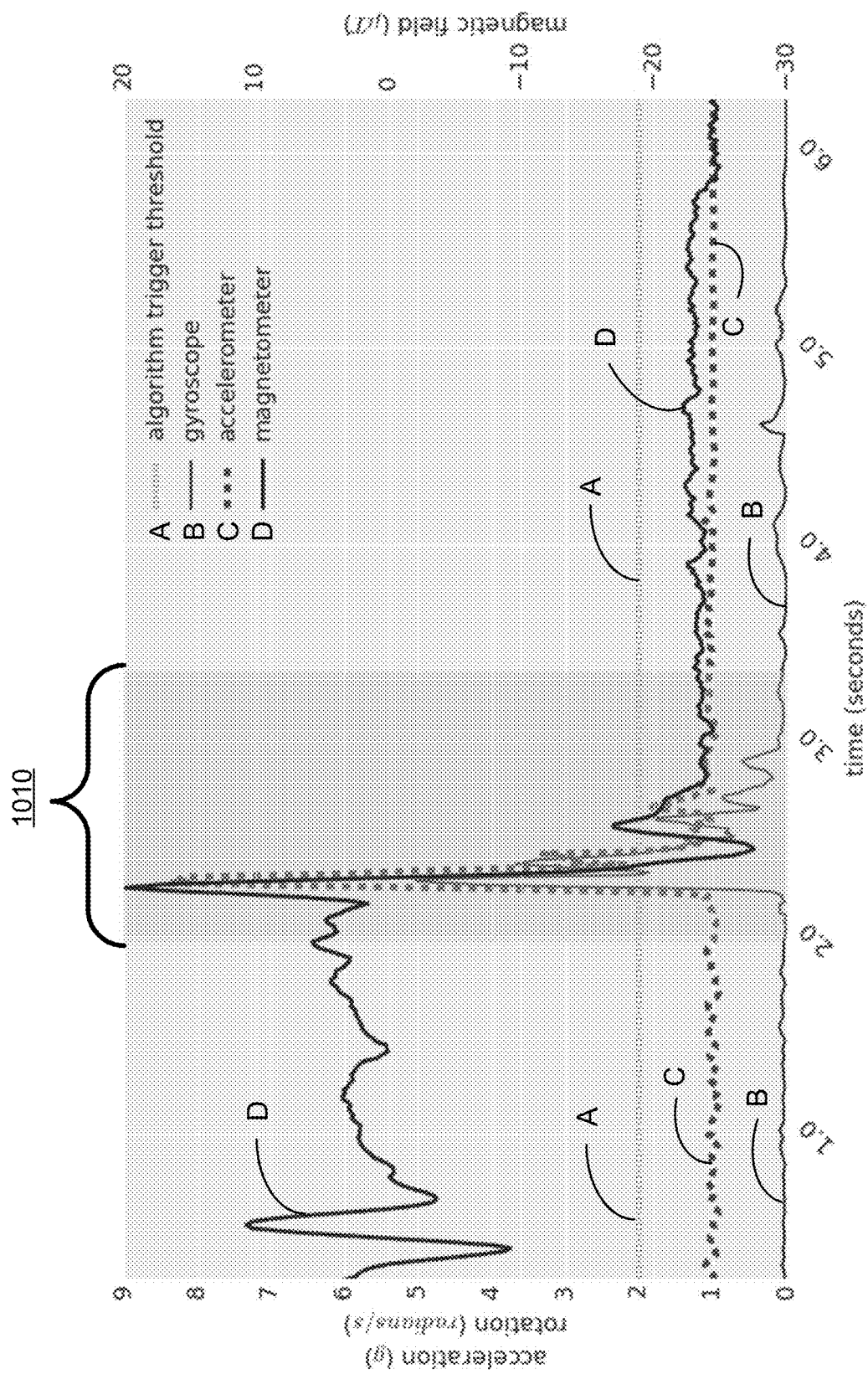
FIG. 10D is a graph illustrating sensor measurements during an accident within a variable duration window according to an embodiment of the present invention.

Turning back to FIG. 9, at step 925, a variable length window corresponding to a second portion of the drive is determined. The second portion of the drive is within the first portion of the drive, i.e., the second portion of the drive is fully encompassed by the first portion. The second portion of the drive includes a second subset of the plurality of measurements. The second subset is a subset of the first subset, i.e., the second subset is fully encompassed by the first subset. The second subset also includes the measurement(s) identified at step 915. In other words, a variable length of time is determined that captures the measurement(s) identified as exceeding the accident threshold value, such that most or all of the measurements taken during the accident are within the variable duration of time, while excluding most or all of the measurements not associated with the accident. Thus, the variable duration window is often smaller than the fixed duration window. FIG. 10D is a graph illustrating sensor measurements during an accident within a variable duration window 1010 according to an embodiment of the present invention.

Turning back to FIG. 9, at step 930, the second subset of the plurality of measurements corresponding to the variable duration window is analyzed to identify an accident in the vehicle during the drive. Once an accident in the vehicle has been identified, one or more changes may be implemented by mobile device 101. For example, the plurality of measurements may be made at a first frequency before the accident is detected and at a second frequency after the accident is detected. In one example, the second frequency may be lower than the first frequency, as the vehicle will likely no longer be moving after the accident. In another example, an identified accident in the vehicle may be used to adjust a calculated driver score associated with the driver, as described further in U.S. Provisional Patent Application No. 62/346,013, filed Jun. 6, 2016, entitled "SYSTEMS AND METHODS FOR SCORING DRIVING TRIPS", herein incorporated by reference in its entirety. In still another example, the measurements indicative of the accident may be provided to a central server (e.g., server 201), and the central server may use the accident measurements to train itself by improving future models and thresholds used to identify accidents. In this example, the user involved in the suspected accident may be prompted to confirm that an accident occurred on the mobile device prior to using the accident measurements to improve future models.

The sensors of the mobile device can be used to identify accidents in a variety of ways. According to embodiments of the present invention, the mobile device can measure events that have a large spike in acceleration and/or deceleration, for example, measured using GPS speed. As an example, for large accidents, the accelerometer output is scanned as a function of time to determine time stamps for which there are spikes in the acceleration of the mobile device accelerometer associated with speed decreases from above a threshold (e.g., 20 mph) to a speed close to zero. After the sudden deceleration, the speed remains near zero for an extended period of time, indicating that the car is immobilized in accordance with a large scale accident.

Because the mobile device is not fixed to the vehicle, the acceleration/deceleration patterns will be unique to the mobile device. As an example, in contrast with an accelerometer mounted in the vehicle, during an accident in which the mobile device is lying on the seat, the deceleration for the mobile device can lag the deceleration of the vehicle since the mobile device will move from the seat to an interior surface of the vehicle (e.g., a door or the firewall) before coming to a stop. As a result, the timing of the acceleration patterns and their characteristics will be unique to a mobile device. Moreover, the orientation of the mobile device can be used to map the accelerations measured using the mobile device to the frame of reference of the vehicle. The reference frame of the mobile device can be converted into the reference frame of the vehicle and then acceleration changes can be analyzed to detect an accident. The combination of the speed data and the accelerometer data can be utilized to filter out large accelerations/decelerations in which the vehicle speed does not change in a manner consistent with the large measured accelerations. An example would be hard braking that results in the phone sliding off the seat and crashing into the wall, thereby generating a large acceleration, but the vehicle continues to move forward after the sudden stop.

Figure 11A:
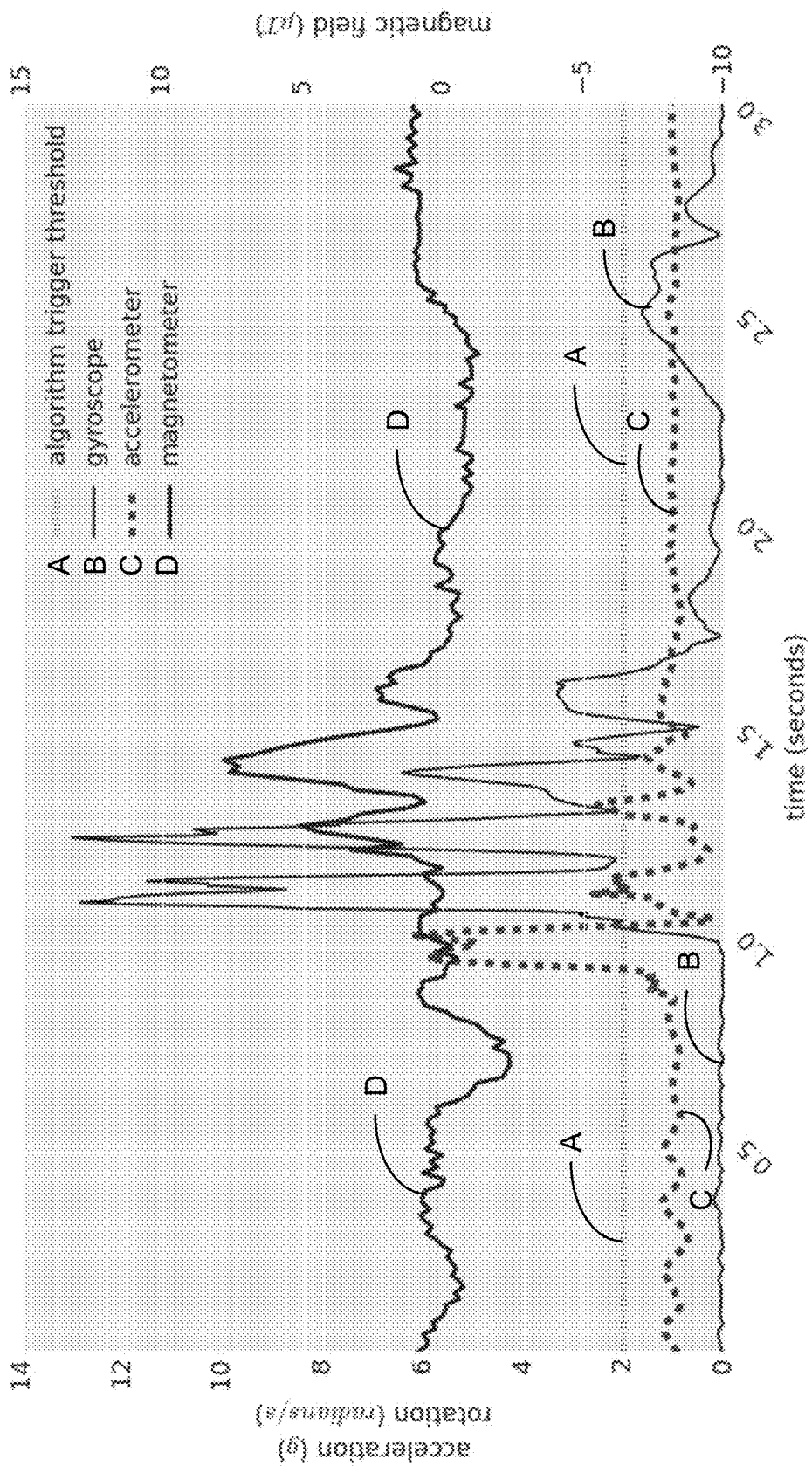
FIG. 11A is a graph illustrating sensor measurements during an accident taken with the mobile device in the left jacket pocket of the driver according to an embodiment of the present invention.
Figure 11B:
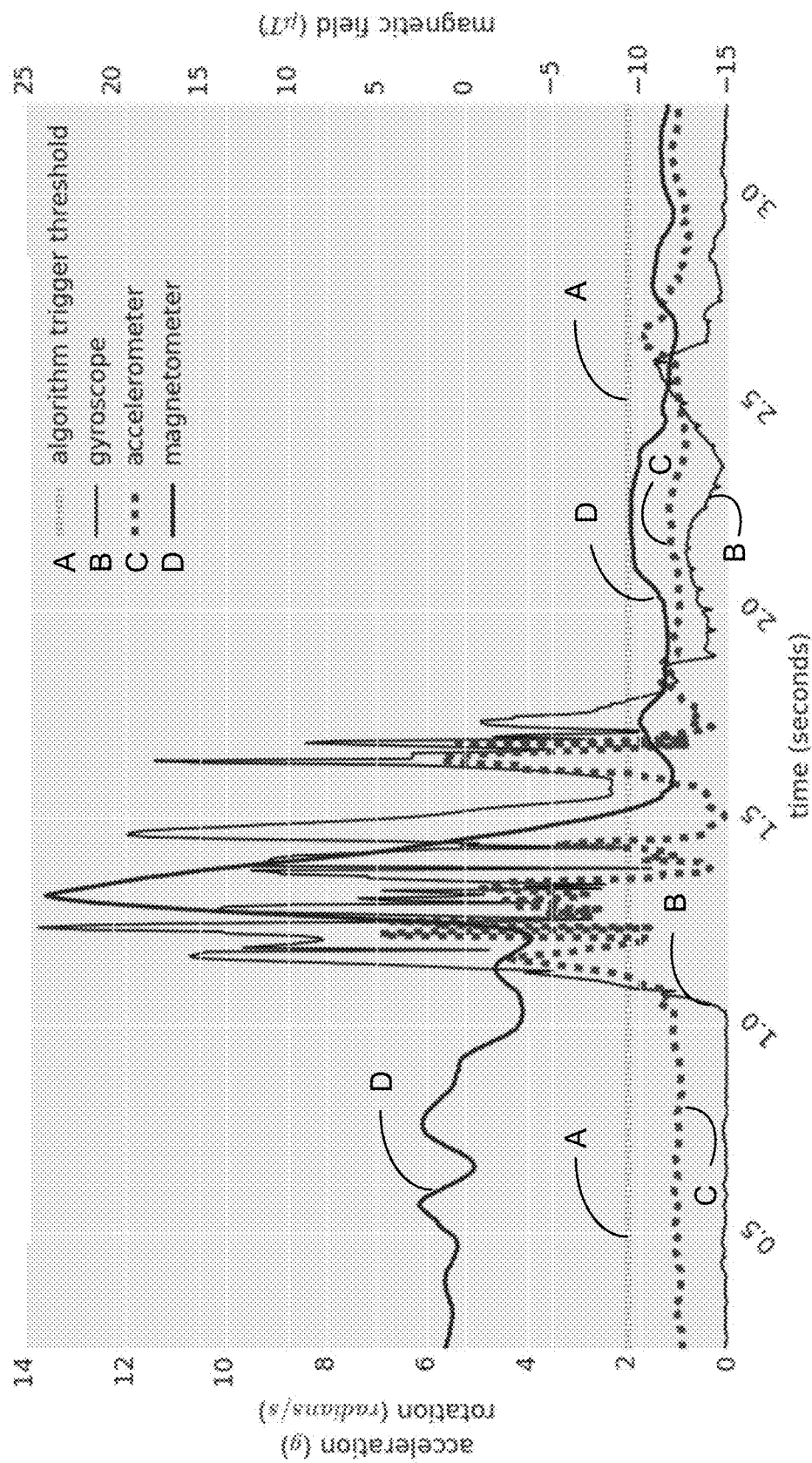
FIG. 11B is a graph illustrating sensor measurements during an accident taken with the mobile device in the left breast pocket of the driver according to an embodiment of the present invention.
Figure 11C:
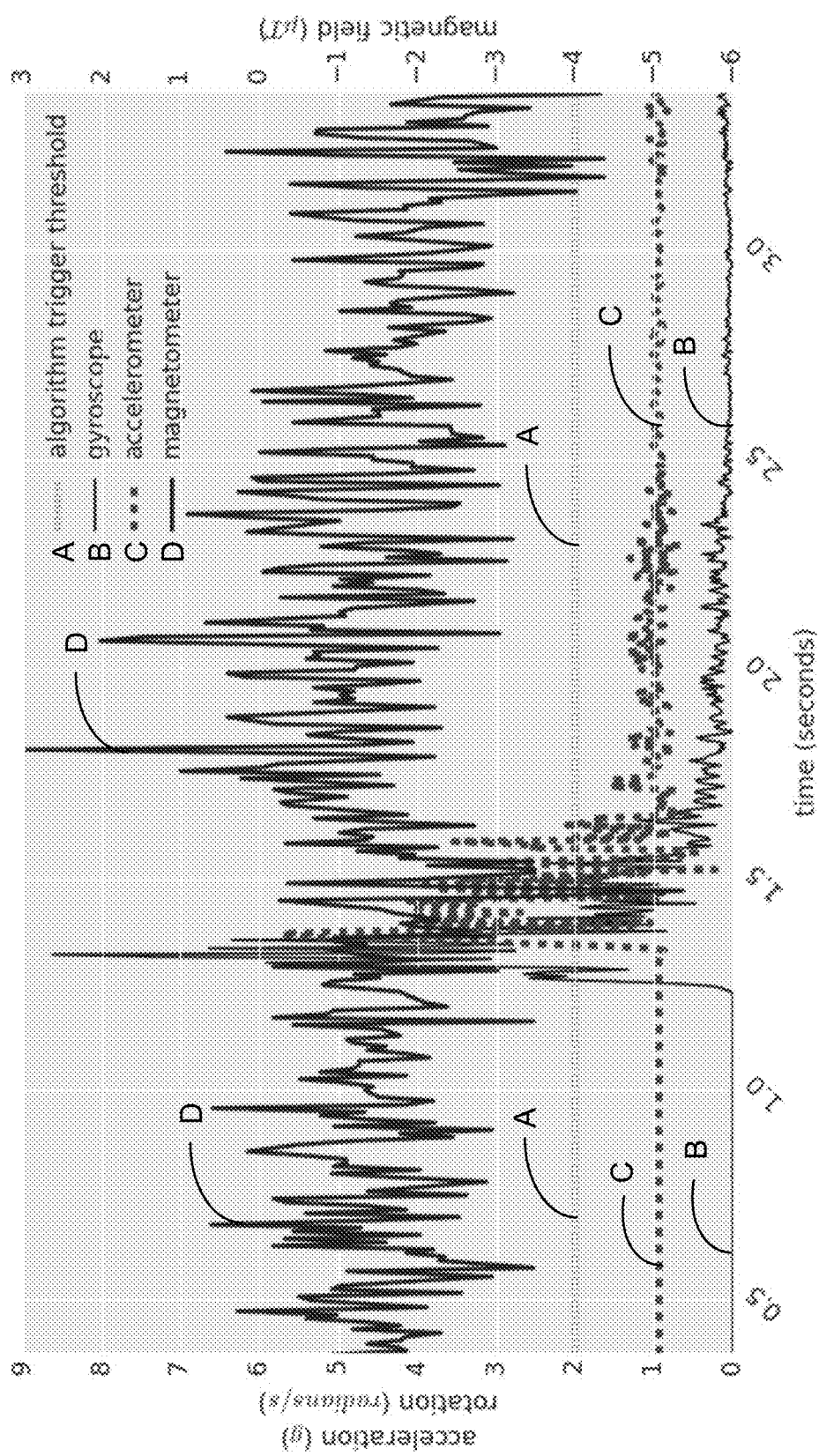
FIG. 11C is a graph illustrating sensor measurements during an accident taken with the mobile device mounted left of center in the vehicle according to an embodiment of the invention.

For example, FIG. 11A is a graph illustrating sensor measurements during an accident taken with the mobile device in the left jacket pocket of the driver according to an embodiment of the present invention. For the accident illustrated in FIG. 11A, the phone was located in the left jacket pocket of the driver and the car was oriented toward the front. FIG. 11A illustrates measurements from a gyroscope, an accelerometer, and a magnetometer with an accident occurring at approximately 1 second. FIG. 11B is a graph illustrating sensor measurements during an accident taken with the mobile device in the left breast pocket of a rear seat passenger with the car oriented towards the front according to an embodiment of the present invention. FIG. 11B illustrates measurements from a gyroscope, an accelerometer, and a magnetometer with an accident occurring at approximately 1.2 seconds. FIG. 11C is a graph illustrating sensor measurements during an accident taken with the mobile device mounted on a window left of center in the vehicle with the car being hit from the rear according to an embodiment of the invention. FIG. 11C illustrates measurements from a gyroscope, an accelerometer, and a magnetometer with an accident occurring at approximately 1.3 seconds.

Figure 12:
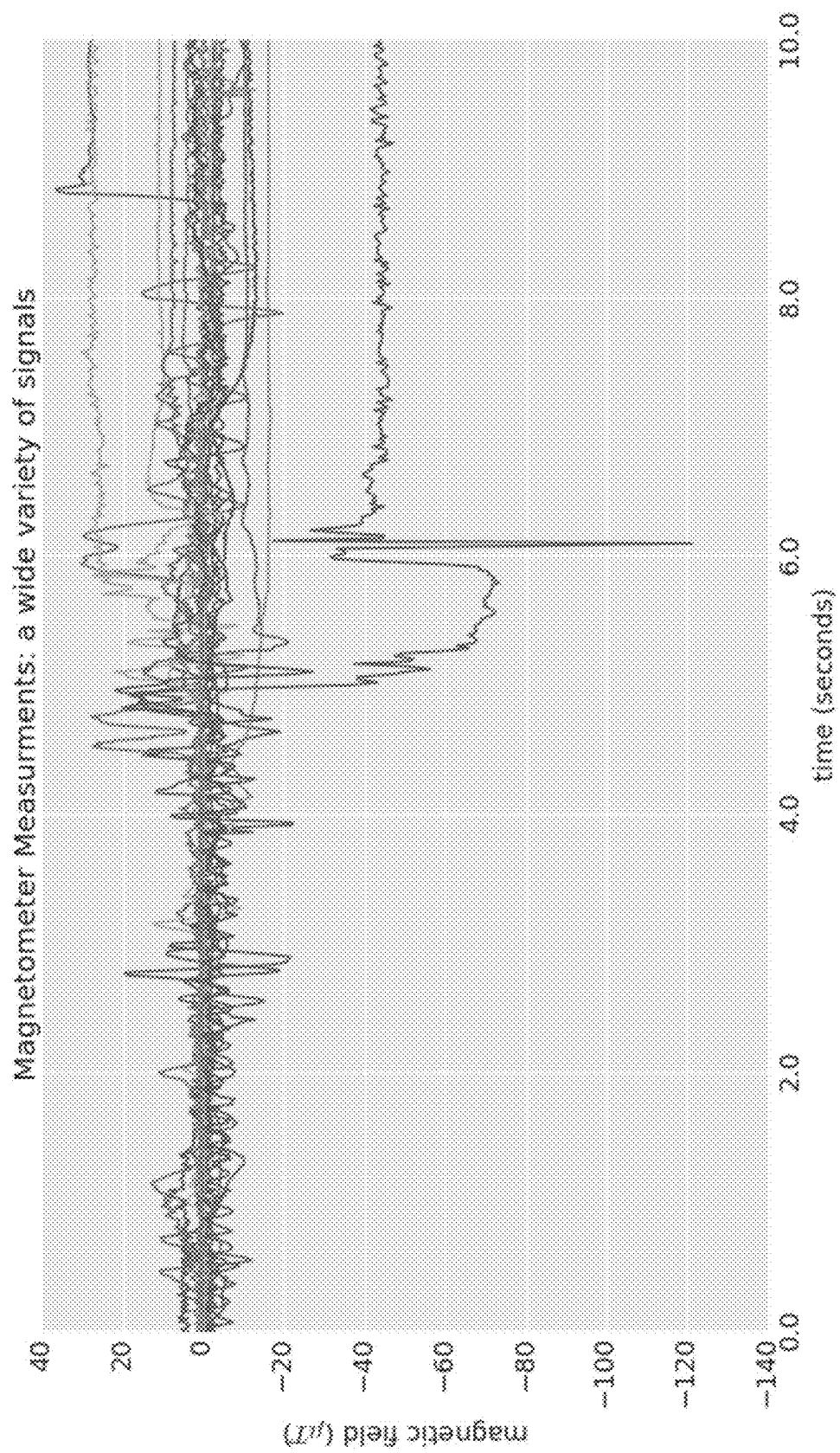
FIG. 12 is a graph illustrating a plurality of magnetometer measurements taken during an accident according to an embodiment of the invention.

FIG. 12 is a graph illustrating a plurality of magnetometer measurements taken by a plurality of mobile devices during accidents according to an embodiment of the invention. As shown in FIG. 12, an accident may be identified by a change in magnetometer signal due to the mobile device changing orientation (e.g., if it is loose or unsecure). In addition, the final resting magnetometer signal may change after an accident based on a change in location of the mobile device in the vehicle, a change in vehicle materials around the mobile device, a change in objects surrounding the mobile device, and the like. Thus, the change in the magnetometer signal is the important factor to consider in determining whether an accident has occurred, and not the absolute values. In this sense, the derivative of the magnetometer signal may be particularly useful. Other data can be collected by the magnetometer before, during, or after an accident, such as whether other vehicles are passing rapidly (e.g., the vehicle in the accident is stopped on the shoulder), whether windshield wipers were being used at the time of the accident, etc.

Figure 13A:
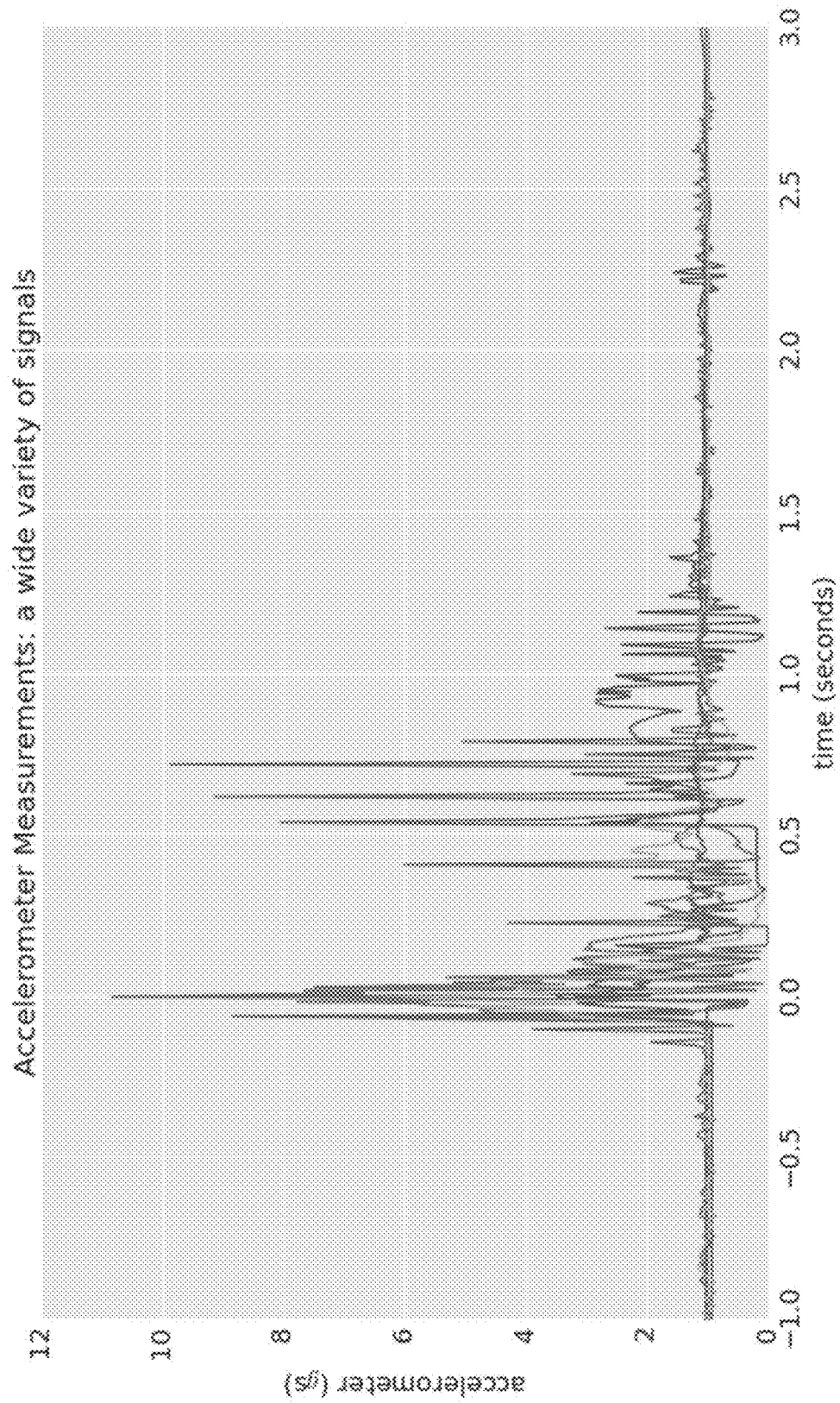
FIG. 13A is a graph illustrating a plurality of accelerometer measurements taken during an accident according to an embodiment of the invention.

FIG. 13A is a graph illustrating a plurality of accelerometer measurements taken by a plurality of mobile devices during accidents according to an embodiment of the invention. The accelerometer measurements are all centered in FIG. 13A such that the accidents occurred at a time of 0.0 seconds. As shown in FIG. 13A, an accident may be identified by an acceleration spike that is caused when an accident occurs. Another identifying feature of an accident as recorded by a mobile device is weightlessness, i.e., when the mobile device goes flying through the air, the acceleration detected on it is 0 (whereas it is usually observed at gravity or 9.809). To determine the magnitude of an accident, measurements taken by the mobile device must take into account accident intensity from when the mobile device hits a soft surface (e.g., the back of the front seat) versus a hard surface (e.g., the dashboard or a window). This can be determined by using the duration of the signal of the mobile device hitting the surface. Initial (and much smaller) secondary movement may indicate if the mobile device hit something or stayed secure, which changes the magnitude of the acceleration signal.

Figure 13B:
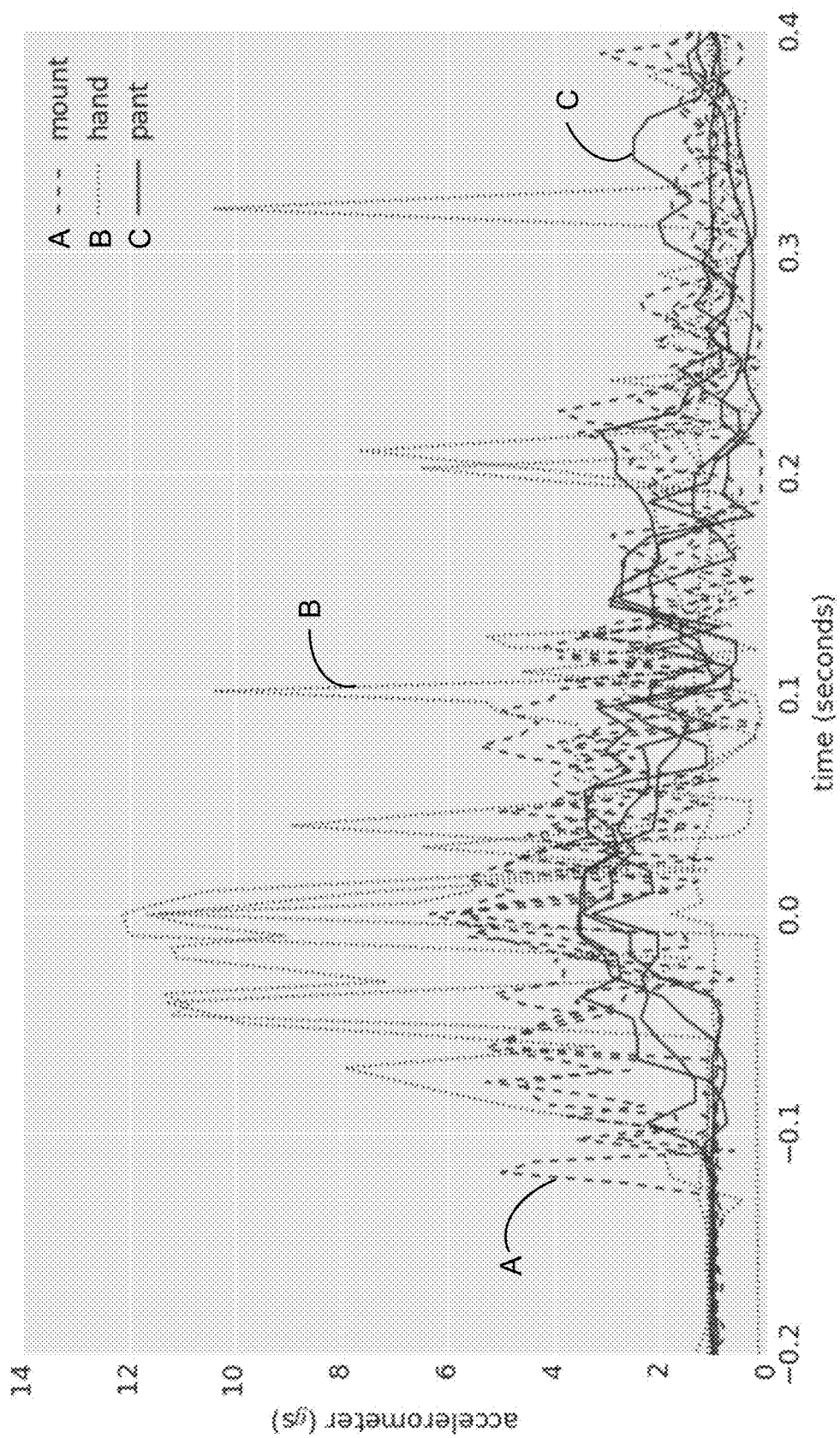
FIG. 13B is a graph illustrating accelerometer measurements taken by a mobile device during an accident in a mount, in a pants pocket, and in the driver's hand according to an embodiment of the invention.

FIG. 13B is a graph illustrating accelerometer measurements taken by a mobile device during an accident in a mount, in a pants pocket, and in the driver's hand according to an embodiment of the invention. Mobile devices that are mounted or in the hand of the driver often times have long durations of time at low accelerations because they are flying through the air and not experiencing the effect of gravity, whereas mobile devices that are well secured (e.g., in a pants pocket) do not stay at low values for very long. Thus, accelerometer measures can vary over a large range as a result of the phone location.

Figure 14:
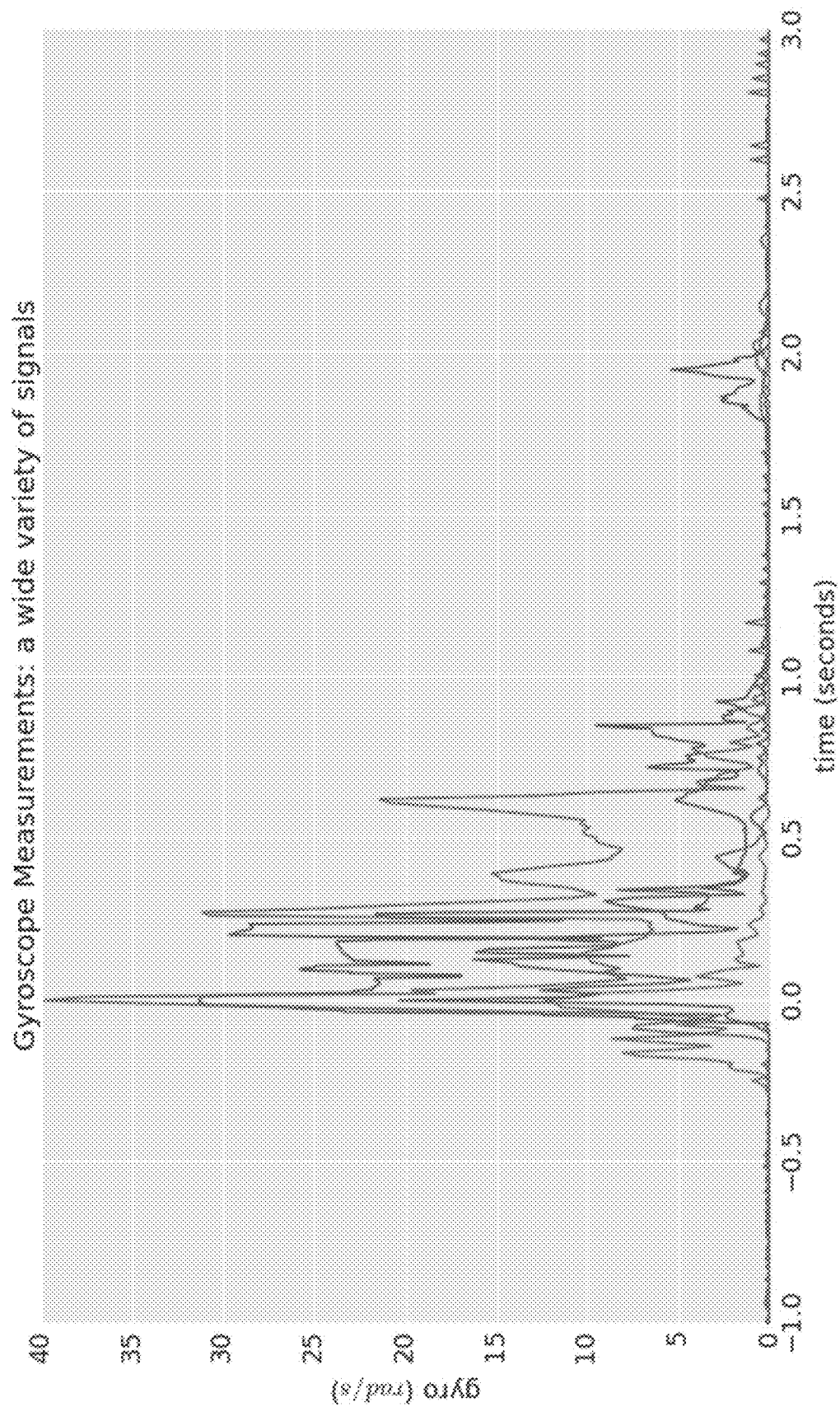
FIG. 14 is a graph illustrating a plurality of gyroscope measurements taken during an accident according to an embodiment of the invention.

FIG. 14 is a graph illustrating a plurality of gyroscope measurements taken by a plurality of mobile devices during accidents according to an embodiment of the invention. The gyroscope measurements are all centered in FIG. 8 such that the accidents occurred at a time of 0.0 seconds. As shown in FIG. 14, accidents may be characterized from gyroscope measurements by certain characteristics of the signal. For example, gyroscope measurements may indicate that the mobile device is spinning through the air at a constant rate, which rarely happens in natural use of a mobile device.

Various other sensors of the mobile device may be used to identify an accident as well. In one example, a barometer or pressure sensor may be used to detect a change in pressure caused by airbag deployment. In another example, a microphone may be used to detect airbag deployment and/or the distinctive metal-on-metal sound cause by an accident. In still another example, a GPS device may be used to confirm that the vehicle is not moving after a detected accident (e.g., the vehicle has pulled over to the side of the road, the vehicle has become disabled, etc.).

Upon detection of an accident, various follow-up steps may be taken according to some embodiments. For example, embodiments of the invention may provide for automatic contacting of first responders, tow trucks, emergency contacts, etc. In another example, relevant information may be pushed to the mobile device for display to the driver. Such relevant information may include common preventative measures for whiplash, if it is detected that a rear collision occurred at a certain intensity.

III. Accident Reconstruction

In some embodiments, after an accident is detected by processes described above, different processes can be performed that assess and reconstruct the accident. As discussed above, in the process of detecting the occurrence of an accident, movement information of the vehicle is collected and analyzed. For example, accidents are evaluated by some embodiments based on the severity of the forces measured. In addition, some embodiments may analyze the direction of forces measured to determine a type of accident, e.g., a broadside accident, a rear-end accident, and/or a roll-over accident, as described further in the Incorporated Applications.

Figure 15:
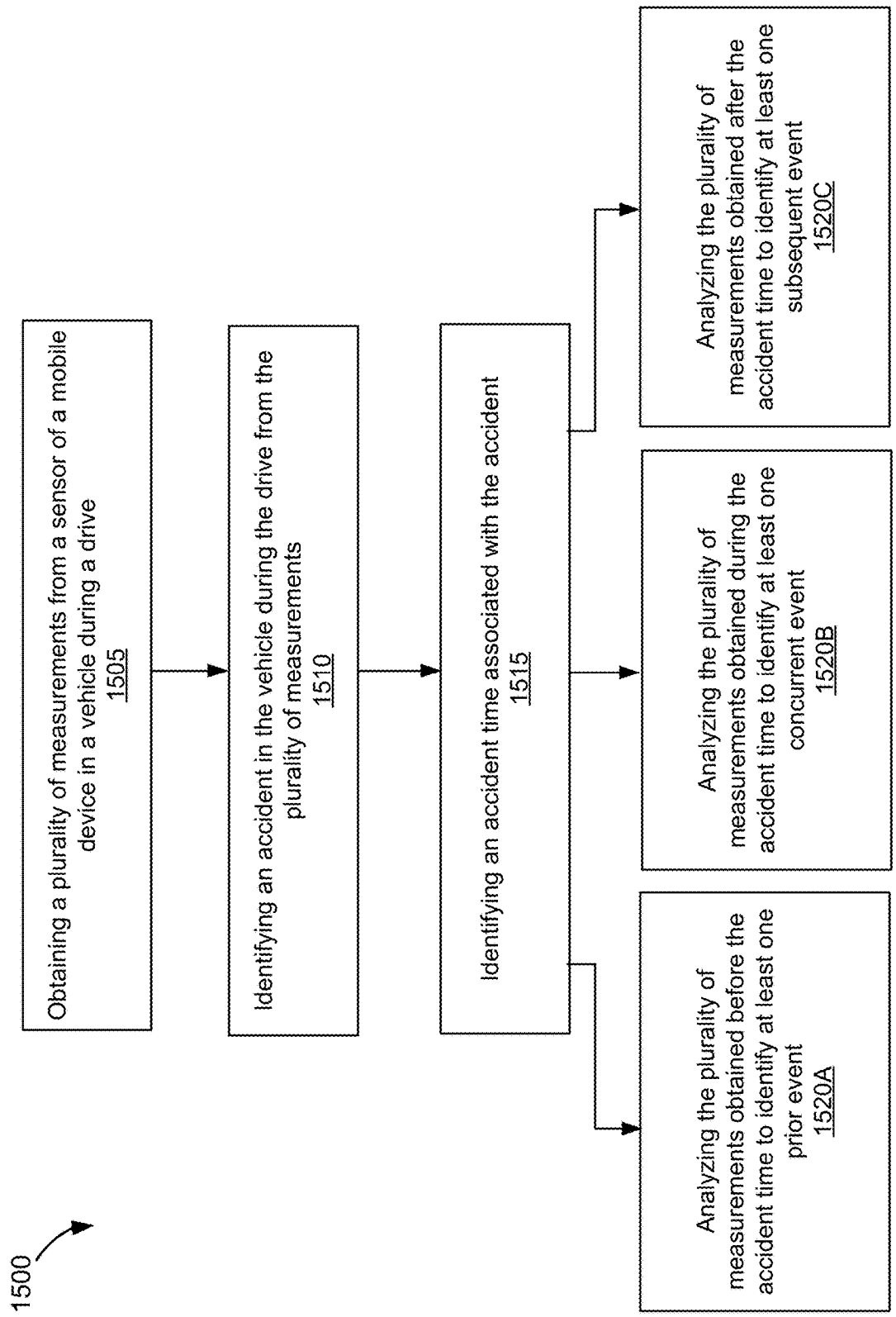
FIG. 15 is a flowchart illustrating a method of reconstructing vehicle accidents according to an embodiment of the invention.

FIG. 15 is a flowchart 1500 illustrating a method of reconstructing vehicle accidents according to an embodiment of the invention. At step 1505, a plurality of measurements are obtained from a sensor of a mobile device in a vehicle during a drive. The mobile device may be, for example, mobile device 101 of FIG. 1. The sensor may include any sensor contained in the mobile device. The plurality of measurements may be aligned to the vehicle's reference frame before being used for further analysis, as described by U.S. patent application Ser. No. 14/749,232, filed Jun. 24, 2015, entitled "METHODS AND SYSTEMS FOR ALIGNING A MOBILE DEVICE TO A VEHICLE", herein incorporated by reference in its entirety.

At step 1510, an accident in the vehicle during the drive is identified from the plurality of measurements. The accident may be identified, for example, according to any of the methods described herein. At step 1515, an accident time associated with the accident is identified. For example, the accident time may be between 9:51:01 AM and 9:51:03 AM.

Following step 1515, at least one of steps 1520A-C may occur. At step 1520A, the plurality of measurements obtained during the drive before the accident time (e.g., prior to 9:51:01 AM) may be analyzed to identify at least one prior event (i.e., at least one event occurring prior to the accident). Thus, some embodiments may analyze different factors leading up to the accident. External information (e.g., weather, road conditions, traffic, etc.) can be combined with detected driving behaviors (e.g., excessive lateral acceleration, hard braking, rapid acceleration, distracted driving, changing lanes, etc.) to provide potential causes of the accident. For example, the plurality of measurements and/or external information may be used to determine that the driver was driving at 23 mph going north when he slammed on his brakes, swerved left and crashed into a barrier at 45 degrees. The plurality of measurements and/or external information may further be used to determine that the driver was not talking or texting on the mobile device, not exhibiting dangerous behavior such as aggressive lane changes, and was going below the speed limit while it was raining. In some embodiments, the period of time before the accident time which is analyzed may correspond to a fixed or variable length window that may be determined by any method.

At step 1520B, the plurality of measurements obtained during the drive during the accident time (e.g., between 9:51:01 AM and 9:51:03 AM) may be analyzed to identify at least one concurrent event (i.e., at least one event occurring during the accident). Thus, some embodiments may analyze what happened during the accident. For example, some embodiments can detect the deployment of different vehicle airbags (e.g., side and/or front), and this information can provide additional information about the accident (e.g., severity, type of accident, etc.). For example, the plurality of measurements may be used to determine at which angle the vehicle hit or was hit, whether a head on collision occurred, whether the vehicle was rear ended, whether the vehicle rear ended another vehicle, whether the vehicle was T-boned or got T-boned, whether the vehicle hit a barrier on the side of the road, whether the vehicle spun out, and the like.

At step 1520C, the plurality of measurements obtained during the drive after the accident time (e.g., after 9:51:03 AM) may be analyzed to identify at least one subsequent event (i.e., at least one event occurring after the accident). Thus, some embodiments may analyze what happened after the accident. For example, some embodiments can detect that the vehicle moved to the side of the road, was disabled and blocking a lane of traffic, rolled over after impact, was hit again by another vehicle after the initial impact, and the like. In some embodiments, the period of time after the accident time which is analyzed may correspond to a fixed or variable length window that may be determined by any method.

Figure 16:
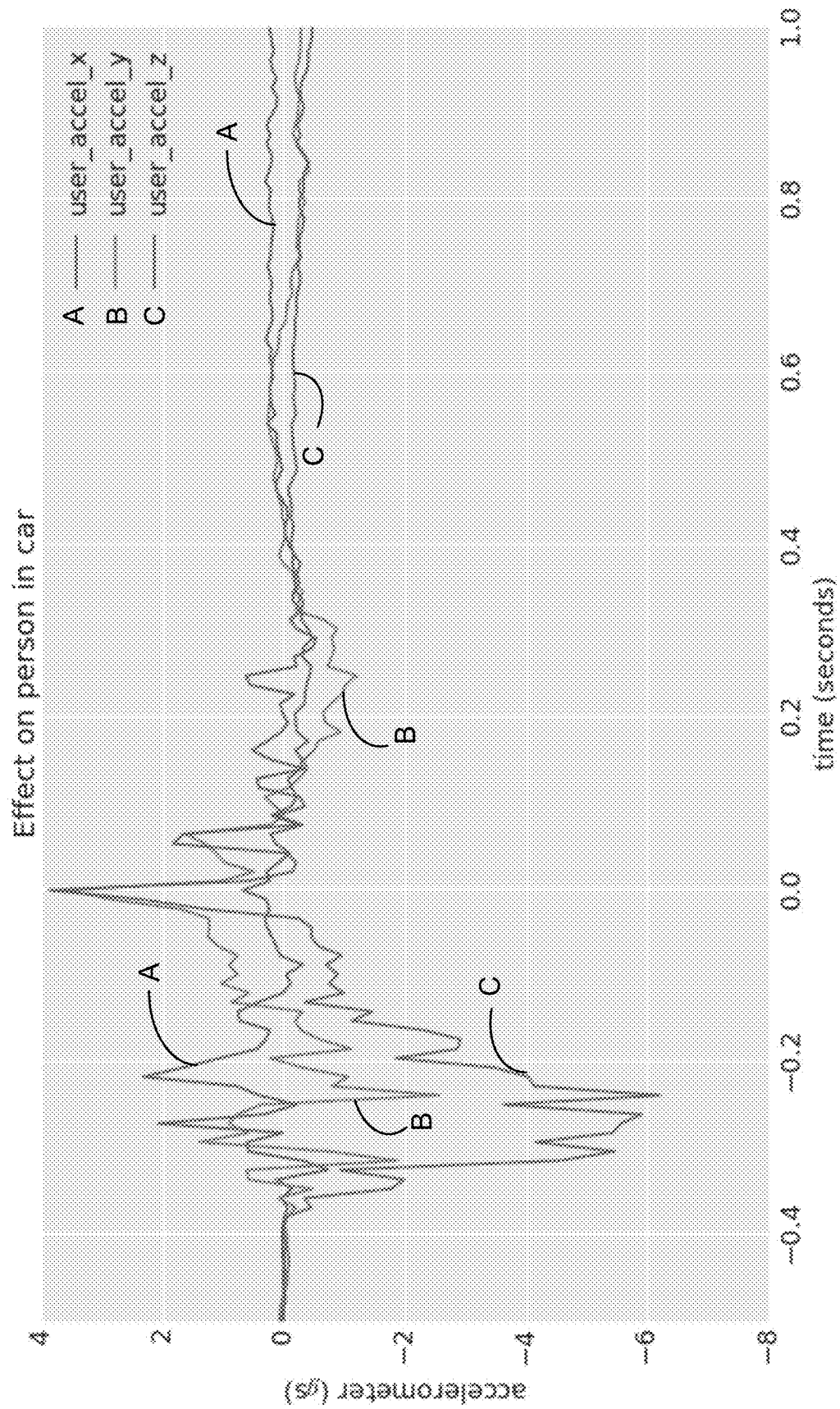
FIG. 16 is a graph illustrating movement of a driver's body after an accident as recorded by an accelerometer of a mobile device positioned in the left breast pocket of the driver according to an embodiment of the invention.

FIG. 16 is a graph illustrating movement of a driver's body before, during, and after an accident as recorded by an accelerometer of a mobile device positioned in the left breast pocket of the driver according to an embodiment of the invention. These measurements may be used to determine magnitude of impact on the driver (or particular parts of the driver) and potential injury to the driver, as the mobile device is essentially fixed to the driver. As shown in FIG. 16, movement of the body back and forth may be observed from the accelerometer of the mobile device.

The accident reconstruction data described herein may be used by a variety of parties. For example, the accident reconstruction data may be used by insurance companies to determine liability for the accident. In another example, the accident reconstruction data may be used by police in reconstructing a fatal accident and/or determining fault for the accident.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The examples and embodiments described herein are for illustrative purposes only. Various modifications or changes in light thereof will be apparent to persons skilled in the art. These are to be included within the spirit and purview of this application, and the scope of any included claims.

What is claimed is:

1. A method comprising:
   measuring a plurality of movements of a vehicle by operating one or more sensors of a mobile device in the vehicle during a drive by a driver over a particular route to generate a plurality of movement measurements;
   detecting, by a processor of the mobile device and based on the plurality of movement measurements, a lateral movement of the vehicle indicative of an unsafe driving behavior of the driver;
   detecting, by the processor of the mobile device, an indication of driver distraction of the driver;
   receiving, by the mobile device, contextual data correlated with the plurality of movement measurements;
   receiving, by the mobile device, information of distracted driving by one or more other drivers of one or more other vehicles along a route of the drive, the information being collected by one or more other mobile devices disposed in the one or more other vehicles;
   aggregating, by the mobile device, the information of distracted driving by the one or more other drivers;
   generating, by the processor of the mobile device, an accident likelihood metric using the detection of the lateral movement of the vehicle indicative of an unsafe driving behavior of the driver, the contextual data, the aggregated information of distracted driving by the one or more other drivers, and the indication of driver distraction of the driver;
   identifying one or more past events associated with one or more waypoints of the particular route, wherein the one or more past events include a past driving behavior of the driver at the one or more waypoints;
   adjusting the accident likelihood metric using the past driving behavior of the driver at the one or more waypoints; and
   predicting, by the processor of the mobile device, based on the accident likelihood metric, that the vehicle will be involved in an accident during the drive along the particular route.

2. The method of claim 1, wherein the contextual data includes at least one of weather data, road quality data, traffic data, unsafe driving path indicators, unsafe driving time indicators or a recommended route.

3. The method of claim 1, wherein the past driving behavior of the driver comprises one or more of rapid accelerations, hard brakes, speeding, or distracted driving.

4. The method of claim 1, wherein the one or more sensors comprises one or more of an accelerometer, a magnetometer, a gyroscope, or a barometer.

5. The method of claim 1, further comprising:
   sensing, by the mobile device, driver interaction with the mobile device while the vehicle is moving; and
   using the driver interaction with the mobile device as an indication of distracted driving in generating the accident likelihood metric.

6. The method of claim 1, further comprising:
   displaying the accident likelihood metric on a display of the mobile device.

7. The method of claim 1, further comprising, based on the prediction, performing at least one of:
   outputting a warning; or
   displaying a map with the particular route highlighted.

8. The method of claim 1, wherein the lateral movement of the vehicle indicative of an unsafe driving behavior of the driver comprises at least one of: a change in a lateral position of the vehicle indicating that the vehicle is going off a road, a lateral movement indicative of an aggressive lane change, or a lateral acceleration exceeding a threshold.

9. The method of claim 1, wherein the information of distracted driving comprise: interaction between the one or more other drivers and the one or more other mobile devices, or movements of the one or more other vehicles indicative of distracted driving.

10. A method, comprising:
    obtaining a plurality of measurements from one or more sensors of a mobile device in a vehicle during a drive;
    obtaining contextual data for the plurality of measurements;
    receiving, by the mobile device, information of distracted driving by one or more other drivers of one or more other vehicles along a route of the drive, the information being collected by one or more other mobile devices disposed in the one or more other vehicles;
    aggregating, by the mobile device, the information of distracted driving by the one or more other drivers;
    generating an accident likelihood metric using the plurality of measurements, the contextual data, and the aggregated information of distracted driving by the one or more other drivers, wherein the accident likelihood metric represents a likelihood that the vehicle will be involved in an accident during the drive; and displaying the accident likelihood metric on the mobile device.

11. The method of claim 10, further comprising:
detecting, by the mobile device and based on the plurality of measurements, a lateral movement of the vehicle indicative of an unsafe driving behavior of a driver of the vehicle,
wherein the accident likelihood metric is also generated based on the detection of the lateral movement of the vehicle indicative of an unsafe driving behavior of the driver.

12. The method of claim 11, wherein the lateral movement of the vehicle indicative of an unsafe driving behavior of the driver comprises at least one of: a change in a lateral position of the vehicle indicating that the vehicle is going off a road, a lateral movement indicative of an aggressive lane change, or a lateral acceleration exceeding a threshold.

13. The method of claim 10, wherein the information of distracted driving comprise: interaction between the one or more other drivers and the one or more other mobile devices, or movements of the one or more other vehicles indicative of distracted driving.

14. The method of claim 10, further comprising:
detecting, by the mobile device, an indication of driver distraction of a driver of the vehicle,
wherein the accident likelihood metric is also generated based on the indication of driver distraction of the driver.

15. The method of claim 10, further comprising:
based on the accident likelihood metric, performing at least one of: outputting a warning, or displaying a map with the route highlighted.

16. An apparatus comprising:
one or more sensors;
a memory that stores a set of instructions; and
a processor configured to execute the set of instructions to:
measure a plurality of movements of a vehicle by operating the one or more sensors during a drive by a driver over a particular route to generate a plurality of movement measurements;
detect, based on the plurality of movements, a lateral movement of the vehicle indicative of an unsafe driving behavior of the driver;
detect an indication of driver distraction of the driver;
receive contextual data correlated with the plurality of movement measurements;
receive information of distracted driving by one or more other drivers of one or more other vehicles along the particular route, the information being collected by one or more other mobile devices disposed in the one or more other vehicles;
aggregate the information of distracted driving by the one or more other drivers;
generate an accident likelihood metric using the detection of the lateral movement of the vehicle indicative of an unsafe driving behavior of the driver, the contextual data, the aggregated information of distracted driving by the one or more other drivers, and the indication of driver distraction of the driver;
identify one or more past events associated with one or more waypoints of the particular route, wherein the one or more past events include a past driving behavior of the driver at the one or more waypoints;
adjust the accident likelihood metric using the past driving behavior of the driver at the one or more waypoints; and
predict, based on the accident likelihood metric, that the vehicle will be involved in an accident during the drive along the particular route.

17. The apparatus of claim 16, wherein the lateral movement of the vehicle indicative of an unsafe driving behavior of the driver comprises at least one of: a change in a lateral position of the vehicle indicating that the vehicle is going off a road, a lateral movement indicative of an aggressive lane change, or a lateral acceleration exceeding a threshold.

18. The apparatus of claim 16, wherein the information of distracted driving comprises: interaction between the one or more other drivers and the one or more other mobile devices, or movements of the one or more other vehicles indicative of distracted driving.

19. The apparatus of claim 16, wherein the past driving behavior of the driver comprises one or more of rapid accelerations, hard brakes, speeding, or distracted driving.

20. The apparatus of claim 16, wherein the contextual data includes at least one of weather data, road quality data, traffic data, unsafe driving path indicators, unsafe driving time indicators, or a recommended route.

* * * * *